(12) United States Patent
Duncan et al.

(10) Patent No.: US 6,332,818 B1
(45) Date of Patent: Dec. 25, 2001

(54) PROPULSION SYSTEM

(75) Inventors: Ian James Duncan; Hugo Anthony Duncan, both of Livingston (GB)

(73) Assignee: Futuretech Technologies Limited, Kent (GB)

(*) Notice: Subject to any disclaimer, the term of this patent is extended or adjusted under 35 U.S.C. 154(b) by 0 days.

(21) Appl. No.: 09/601,721

(22) PCT Filed: Feb. 5, 1999

(86) PCT No.: PCT/GB99/00388

§ 371 Date: Aug. 4, 2000

§ 102(e) Date: Aug. 4, 2000

(87) PCT Pub. No.: WO99/39973

PCT Pub. Date: Aug. 12, 1999

(30) Foreign Application Priority Data

Feb. 7, 1998 (GB) .................................................. 9802570

(51) Int. Cl.⁷ .............................. B63H 1/18; B63H 1/00; B63H 3/00
(52) U.S. Cl. .................................. 440/66; 440/49; 440/50
(58) Field of Search .................................. 440/1, 49, 50, 440/72, 66; 416/27, 30, 29, 163, 164, 167, 223 R, 247 A

(56) References Cited

U.S. PATENT DOCUMENTS

| | | | |
|---|---|---|---|
| 2,706,960 | * 4/1955 | Crew | 440/72 |
| 2,850,106 | * 9/1958 | Swan | 440/50 |
| 3,138,136 | * 6/1964 | Nichols | 416/163 |
| 3,588,272 | * 6/1971 | Kristinehamn et al. | 416/30 |
| 3,709,187 | * 1/1973 | Marco et al. | |
| 3,826,590 | * 7/1974 | Kobelt | 416/27 |
| 3,938,463 | * 2/1976 | Hecker et al. | |
| 4,142,829 | * 3/1979 | Inoue | 416/27 |
| 4,790,782 | * 12/1988 | McCormick | 440/61 |
| 4,941,423 | * 7/1990 | Van Tassel | 114/289 |
| 5,061,212 | * 10/1991 | Morgenthaler et al. | 440/50 |
| 5,145,318 | * 9/1992 | Olson | 416/167 |

FOREIGN PATENT DOCUMENTS

| | | | |
|---|---|---|---|
| 0 077 931-A2 | * 5/1983 | (EP) . | |
| 2 027 132-A | * 2/1980 | (GB) . | |
| WO-92/06000-A | * 4/1992 | (WO) . | |

* cited by examiner

*Primary Examiner*—Sherman Basinger
(74) *Attorney, Agent, or Firm*—Dykema Gossett PLLC

(57) ABSTRACT

A propulsion system for a water craft having at least one shaft extending rearwardly form the transom of the hull of the craft and a drive system for driving the at least one shaft. A surface piercing propeller is mounted on the at least one shaft, proximal to the trailing edge of the hull, so that the propeller operates in a transom cavity created behind the hull, in use of the craft. The ratio (S/C) of the spacing of the blades to the blade cord for each propeller is at least 2.0 along substantially the whole length of the blades. The propulsion system has a high operational efficiency particularly suited for high speed marine craft.

38 Claims, 12 Drawing Sheets

Fig. (10b)
PRIOR ART

Rev. Limiter

Stall Limiter

PROPULSION SYSTEM

BACKGROUND OF THE INVENTION

The present invention relates to a propulsion system for high speed marine craft. In particular, the invention concerns an improved surface drive propulsion system having high operational efficiency.

Known propulsion systems for high speed craft display considerable limitations in performance at low speeds, at high speeds, or throughout the desired speed range. The simplest form of propulsion for marine craft, the submerged propeller, has many limitations and tends to have low efficiency characteristics at high speeds. An improved drive system, the 'Z' (or stern) drive, introduced in the 1960's, provides improved efficiency at higher speeds for smaller craft. However, at very high speeds problems are experienced with this type of propeller and often a surface-piercing propeller must be fitted instead.

For high craft speeds surface-piercing propellers fitted either to a specialised surface drive system, or to a Z-drive, give the highest efficiencies. However, conventional surface-piercing propellers are extremely power-absorbing at low speeds. One reason for this is that because these propellers are designed to be run semi-immersed their diameter is large compared to a conventional propeller. Thus until the craft has achieved planing speed the propeller is normally excessively immersed such that the flow and torque requirement are excessively high. A second factor, which is less well understood, is that at low speeds and high power the blades are running at a high lift coefficient, the vapour cavity behind the blade is wide and the distance between the external surface of one blade cavity and the propulsive surface of the succeeding blade is small. Thus the blade is effectively pushing against a vapour bubble with an evident loss of thrust. These two factors in particular cause craft fitted with surface drives to have considerable difficulty getting onto the plane which means they have to be fitted with excessively powerful engines. As a result of the limitations imposed by these drives their usage remains restricted and their cost is high. Also, such propellers are normally mounted well behind the hull which renders them vulnerable to damage when manoevreing or at berth. In most cases, the propeller cannot be raised sufficiently to enable the craft to be beached.

In recent years, jet pump drives have also become increasingly employed for two classes of craft: small performance boats and personal water-craft (jet bikes etc.), and larger luxury yachts and performance work-boats. However, jet drives suffer from a number of distinct disadvantages: in practice the efficiency is usually less than 60% and is often less than 50%. Jet drives are also relatively complex and tend to be expensive; installation is also more onerous than for other drives.

SUMMARY OF THE INVENTION

It is an object of the present invention to provide a propulsion system which substantially avoids or minimises one or more of the foregoing disadvantages.

Accordingly, we provide a propulsion system for a water craft, the system comprising: at least one shaft which extends rearwardly from the transom of the hull of the water craft; a surface-piercing propeller mounted on said at least one shaft, proximal to a trailing edge of the hull, so that said propeller operates in a transom cavity created behind the transom of the hull in use of the craft; and drive means for driving said at least one shaft; wherein said propeller comprises a hub and a plurality of blades angularly spaced apart, preferably substantially equidistantly, therearound, the ratio (S/C) of the spacing (S) of the blades to the blade chord (C) being at least 2.0 along substantially the whole length of the blades.

An advantage of the propulsion system of the invention is that the high ratio of blade spacing to blade chord (at least 2.0 along substantially the whole length of each blade) enables much greater efficiency to be achieved than with prior known propulsion systems of the surface-piercing propeller type in which the ratio of blade spacing to blade chord has generally been in the region of unity or, more often, less than unity.

One reason for the increased efficiency which is achieved is that the distance between the trailing surface of one blade and the propulsive surface of the succeeding blade is relatively large and therefore, in use, the pressure field of the latter (following) blade is well behind the blade cavity created behind the trailing edge of the former (preceding) blade. The increased efficiency due to this feature is mainly seen at low craft speeds. Another advantage of the relatively small blade chord is that the transition periods during which each blade enters the water and leaves the water form a relatively small part of the propeller cycle as compared to the prior known surface drive systems where the blades are of relatively large chord. The blades operate at considerably reduced efficiency during these transition periods.

It will be understood that the term "transom cavity" in relation to the hull of the craft refers to the air pocket created immediately behind the trailing edge of the hull, after start up of the craft and at low and high craft speeds. By positioning the propeller close to the trailing edge of the hull, so as to operate in said transom cavity created thereby, we avoid the excessive power losses attributable to churning effects in conditions where the blades are operating in areas of high water swirl velocity (as in conventional propulsion systems).

In relation to each blade, it will be appreciated that the term "blade cavity" refers to the (underwater) vapour space created behind the trailing edge of each blade of the propeller in use thereof.

The ratio (S/C) of the blade spacing (S) of adjacent blades to the blade chord (C) is desirably in the range of from two to five or more, preferably in the range of 2.3 to 4.0, along ubstantially the whole length of the blades. Although the ratio S/C could be chosen to be higher than five, it will be appreciated that there will be an upper limit at which the blades are too spindly to be sufficiently effective in practice. We believe this is likely to be the case in most situations for a ratio of S/C which is above 10. A high ratio will, however, be desirable where one wishes to convert a low engine power into high propeller speed.

The ratio (S/C) of the blade spacing (S) to the blade chord (C) is preferably at least 2.0 along at least 90% of the length of the blades, desirably along at least 95% or more of the length of the blades.

Preferably, the hub of the propeller is relatively large. Desirably, the ratio ($H_d/P_d$) of hub diameter ($H_d$) to propeller diameter ($P_d$) is at least 0.35, preferably 0.4 or more. An advantage of such a large hub diameter is that at low speeds (where the propeller tends to be in a lower position in the water than at high, planing, speeds) a large percentage of the area swept by the blades in each rotation of the propeller is in air. This is particularly beneficial at low craft speeds where a high percentage of swept air is required to obtain high thrust at such low speeds. In the known prior art propulsion systems, at low speeds a large percentage of the swept area is underwater, (operation of the blades thus requiring greater power absorption from the engine), leading to significantly reduced thrust at these low speeds, as compared with the system of the present invention.

Additionally, a large hub diameter to propeller diameter ratio means that there tends to be much less variation in water flow velocity along the length of the propeller blades than in conventional propellers and as a consequence the variation in performance in off-design conditions is less marked: generally, the shorter the blades relative to the hub diameter the less the radially acting flow forces generated in the water and, in turn, the greater the efficiency of the propulsion system. Also the shorter the blades, the less is the torsional bending and deflection of the blades during use. In many case the blades may be of constant section and merely twisted along their length without incurring significant performance loss.

The propeller is preferably mounted on said at least one shaft in such a way that the plane of the propeller is substantially perpendicular to said shaft. Moreover, the shaft is preferably mounted to the craft in such a manner that the plane of the propeller is substantially normal to the line of thrust. This has the advantage of maximising the thrust delivered from the engine at start-up and low speeds.

The propeller diameter is also desirably chosen to be relatively large. For example, the ratio ($P_d/H_s$) of propeller diameter ($P_d$) to static hull draught ($H_s$) may be at least 1.4 or more. One benefit of using a large diameter propeller is that larger peripheral speeds can be obtained using the same r.p.m. as conventional propellers.

In the propulsion system of the invention, the angle or "pitch" ($\beta$) of the blades of the propeller, relative to the rotational axis of the propeller, is preferably variable. This may be achieved by providing blade pitch control means in the propulsion system for controlling the pitch of the blades. The blade pitch control means may be mechanical means and/or electrical means and/or pressurised fluid, preferably hydraulic means. The pitch control means is preferably formed and arranged to enable the pitch angle ($\beta$) of the blades to be varied between 50 degrees and 120 degrees. By controlling the pitch of the blades in this manner, the overall efficiency of the propulsion system may be improved. For example, said blade control means may be formed and arranged to allow the blades to be pitched at an angle of up to 80 degrees, in some cases approaching 90 degrees, in the low speed operational range of the craft. This maximises the available thrust for a given engine power.

Said blade control means may, in its simplest form, comprise mechanical pitch control means in the form of a pitch control rod linked to carrier means on which the blades are mounted, said control rod and carrier means being formed and arranged such that axial motion of the control rod is translated into rotational motion of the carrier means, whereby the blades are rotated so as to change their angle or so-called "pitch" (relative to the rotational axis of the propeller). Conveniently, the shaft on which the propeller is mounted is hollow and the pitch control rod is disposed therein.

Preferably, the propulsion system includes at least two shafts extending rearwardly from the transom of the hull of the craft, each shaft having a propeller as above-described mounted thereon. Where two such propellers are provided, blade pitch control means is preferably-provided for controlling the pitch of the blades on each propeller. Said blade control means may advantageously be formed and arranged for varying the pitch of the propeller blades of each propeller, preferably independently, depending on the desired and/or actual course of the craft, thereby enabling the course of the craft to be controlled. This avoids the need for a rudder to be provided in the craft. In its simplest form, said blade control means may comprise a said pitch control rod disposed in each of the two propeller shafts in the manner above described.

Where the propulsion system includes two said propellers, the respective drive shafts are usually arranged to be rotated in opposite directions so as to substantially cancel any side thrust generated by the propellers.

Said drive means conveniently comprises a short, universal drive shaft and a reduction gear box, if desired, driven by an internal combustion engine. Alternatively, the drive means may comprise an electric, hydraulic or air driven motor.

The blade pitch control means may advantageously further include an intelligent pitch controller system for automatically controlling the pitch of the blades depending on one or more of: the desired speed of the craft; actual speed of the craft; desired engine speed; actual engine speed; position of the craft in the water; and the desired and/or actual course of the craft. The intelligent pitch controller may, for example, control axial movement of the or each pitch control rod (where provided) so as to vary the pitch of the propeller blades of the two propellers, preferably independently, so as to provide steering, and preferably also speed control, of the craft. The pitch controller system may conveniently comprise an electrical or electronic "closed loop" type controller which controls axial movement of the pitch control rods.

The intelligent pitch controller system may also control engine speed of the craft.

In a preferred embodiment, said intelligent pitch controller is adapted to vary the pitch of the blades so as to maintain the rotational velocity of the propeller at a constant velocity, preferably at a predetermined constant velocity at which the propeller is designed to operate when the craft is travelling at high forward speeds.

As the blades can be optimally oriented to produce maximum thrust for any particular operational condition, this compensates for any loss of thrust attributable to the use of blades having relatively narrow chord, in order to achieve the claimed relatively large blade spacing to blade chord ratio. Moreover, the infinitely variable forward and reverse drive achieved by means of the described pitch control of the blades, particularly where at least two propellers are provided, allows easy manoevreing of the craft in port and at high speed drag is considerably reduced by the lack of rudders.

The number of blades per propeller would normally be between two and five, preferably three or four blades, per propeller. In some instances more than five blades may though be desirable e.g. to obtain a smoother drive. The blades may be twisted along their lengths. Preferably, the twist is no greater than 25 degrees, most desirably no greater than 20 degrees. Above 20 degrees it has been found that a decrease in efficiency is generally exhibited.

Where, due to practical design considerations, it is not possible to mount the propeller immediately adjacent to the transom of the craft's hull, skirt means may additionally be provided to bridge any gap between the transom and the propeller. The skirt means assists in directing fluid flow towards the propeller blades.

Optionally, the end profile of the hull of the craft may comprise at least one convex, generally arcuate profile, projection which corresponds generally to the profile of the hub of said at least one propeller. The arc of said convex portion may be up to approximately 180 degrees. Said at least one propeller is preferably disposed on its shaft in front of said convex end portion so that the propeller is disposed opposite said convex end projection of the hull.

Where the water craft having the propulsion system of the invention is a leisure craft, for example a jet ski, guard means is preferably provided for enclosing the propeller(s) so as to prevent any obstruction entering between the blades i.e. for safety reasons.

BRIEF DESCRIPTION OF THE SEVERAL VIEWS OF THE DRAWING

Preferred embodiments of the invention will now be illustrated, by way of example only, and with reference to the accompanying drawings in which:

FIG. 10(b) is a cross-sectional side view of a corresponding portion of a conventional variable pitch propeller;

DETAILED DESCRIPTION OF THE INVENTION

For the avoidance of doubt it will be understood that the terms "blade spacing (S)" and "blade chord (C)" as used hereinbefore and hereafter are defined as follows:

The blade chord (C) is deemed to be the length of a line extending across a normally wetted surface of the blade from the leading edge (LE) to an effective trailing edge (TE1) of the blade at a constant radius from the rotational axis of the propeller.

The effective trailing edge (TE1) of the blade is defined as that edge of the normally wetted surface of the blade to which a forward side ($C_a''$) of the blade cavity ($C_a$) is attached.

The blade spacing (S) is deemed to be the rotational distance between two adjacent blades, measured from the centre of the chord of one blade to the centre of the chord of the next adjacent blade.

(The references in brackets used in the above definitions are taken from FIGS. 12–16, the embodiments illustrated in these FIGS. being described in detail herein in a later section of the text herebelow.)

Figure 1:
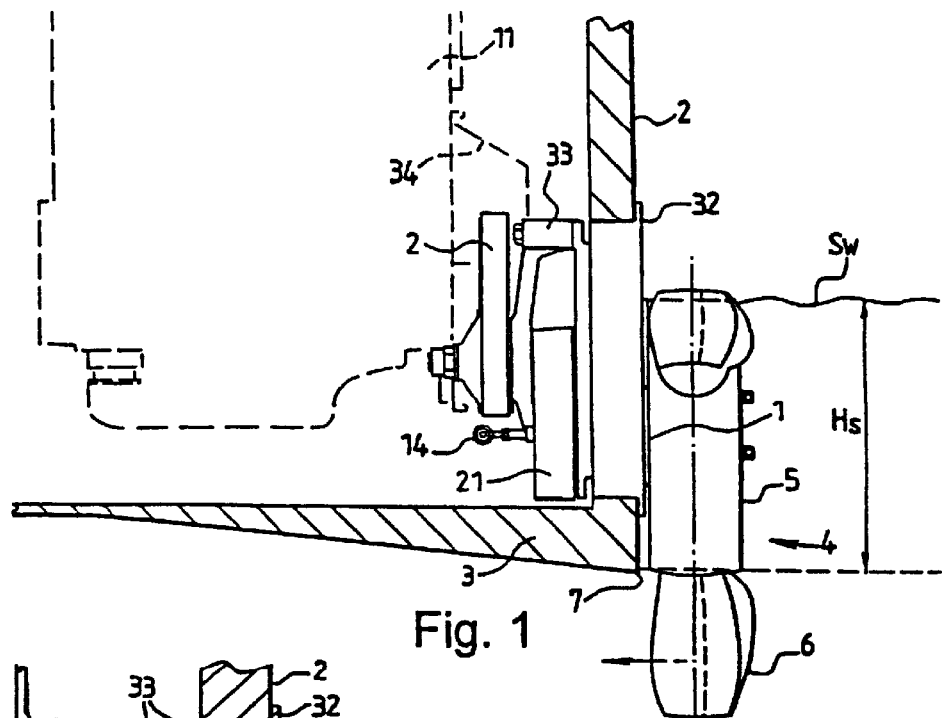
FIG. 1 is a part-schematic side view of a portion of a water craft provided with a propulsion system according to one embodiment of the invention.
Figure 2:
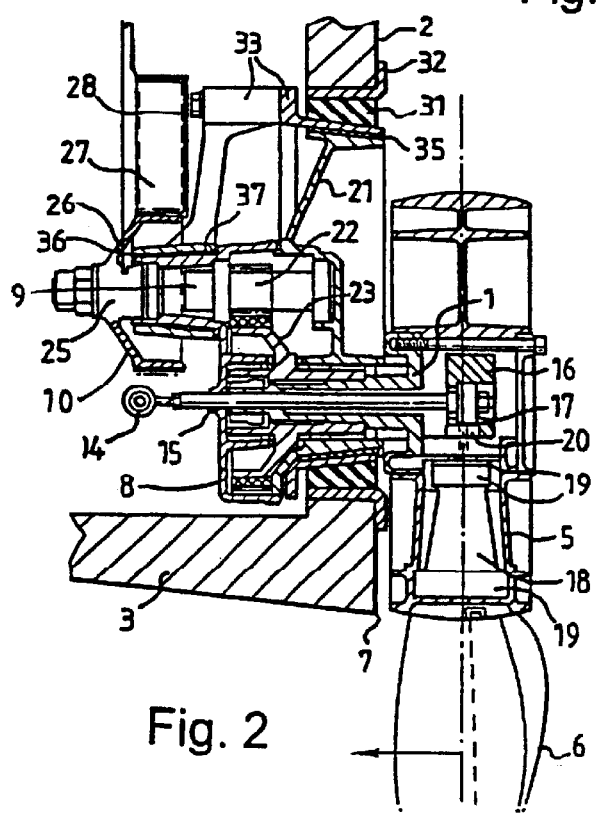
FIG. 2 is a detached cross-sectional side view (taken along the line X–X' in FIG. 6) of a portion of a water craft provided with a propulsion system according to another embodiment of the invention.
Figure 3:
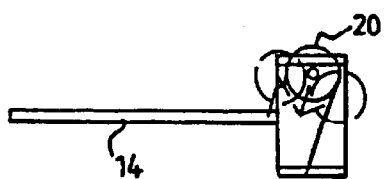
FIG. 3 is a rear view of a portion of a pitch control mechanism incorporated in the apparatus of FIG. 2.

A propulsion system according to one possible embodiment of the invention is shown in FIG. 1. The system is shown in part-schematic side view in FIG. 1 and has a shaft 1 extending rearwards from the transom 2 of the hull 3 of the craft (shown in cross-section) to which is attached a surface-piercing propeller 4 featuring a relatively large diameter hub 5 to which are attached a number of blades 6 which are of relatively short length and of relatively narrow chord (as compared with conventional surface-piercing propellers).

The propeller 4 is mounted immediately adjacent to the trailing edge 7 of the hull 3 such that it operates in the transom cavity created immediately behind the hull, in use of the craft. The static hull draught (i.e. height of surface water level $S_w$ above the base of the hull 3) is denoted in FIG. 1 by the reference $H_s$. The base of the propeller hub 5 is aligned with the base of the hull 3. If the rotor cannot be arranged immediately behind the trailing edge of the hull a skirt (not shown) may conveniently be fitted to bridge any gap between the hull 3 and the blades 6 to direct the flow towards the latter. The shaft 1 runs in a bearing housing 8 mounted to the transom 2. The shaft 1 is driven by a short universal drive shaft 9, a reduction gear box 10 from an internal combustion engine 11. This type of drive is shown by way of example only and numerous other drive arrangements are possible. For example, a simplified drive for use with electric, hydraulic, or air motors is shown in FIG. 7 (see below).

Figure 4:
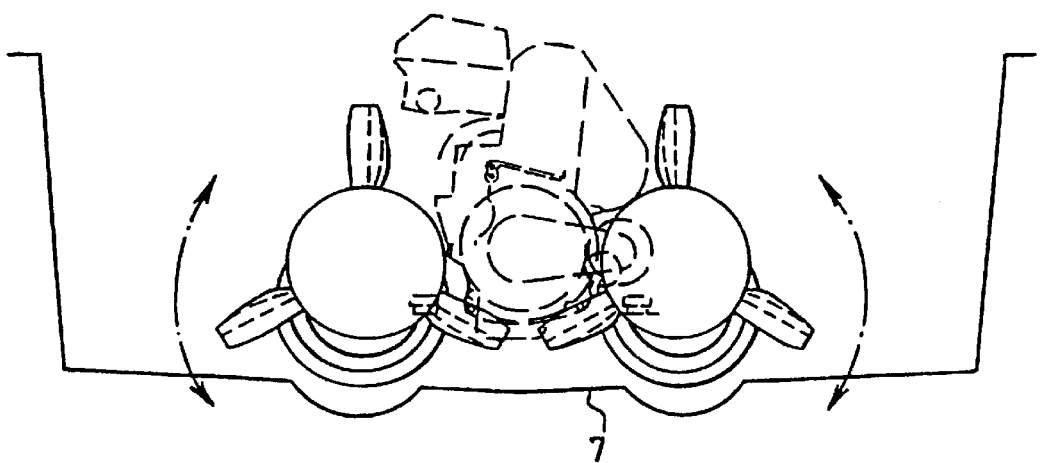
FIG. 4 is an end view of the apparatus of FIG. 2, viewed from outside the craft's hull, with the propellers raised for beaching.
Figure 5:
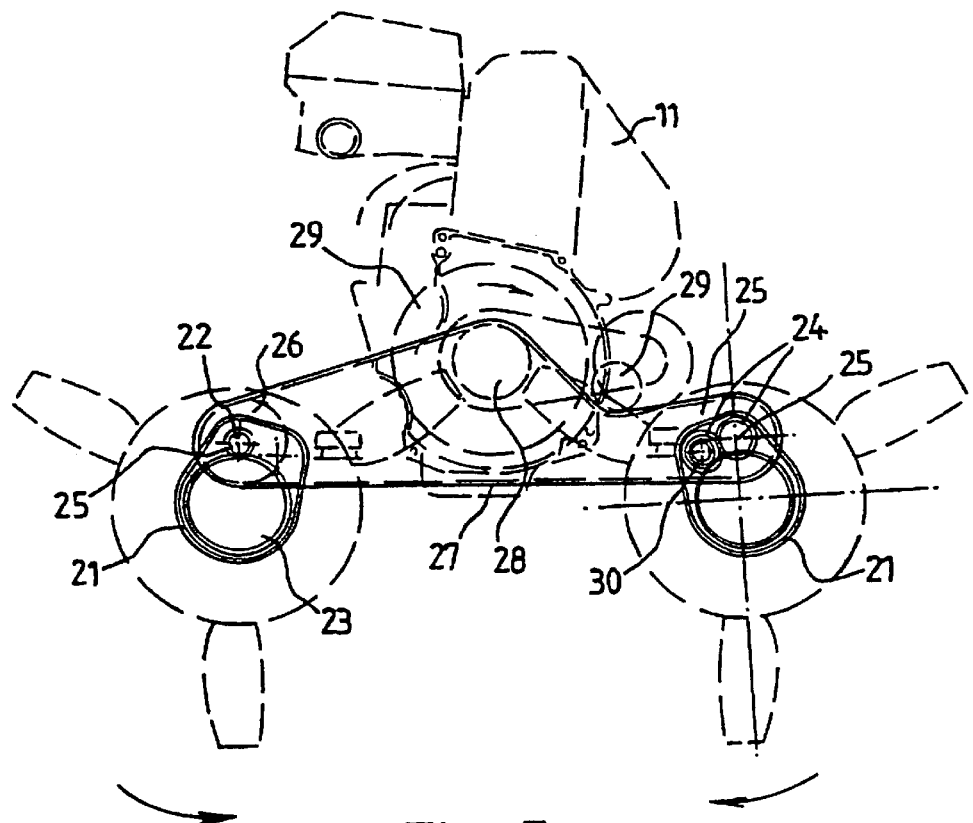
FIG. 5 is an end view of the apparatus of FIG. 2, viewed from inside the craft's hull with the craft's engine shown in hatched outline (for simplicity)
Figure 6:
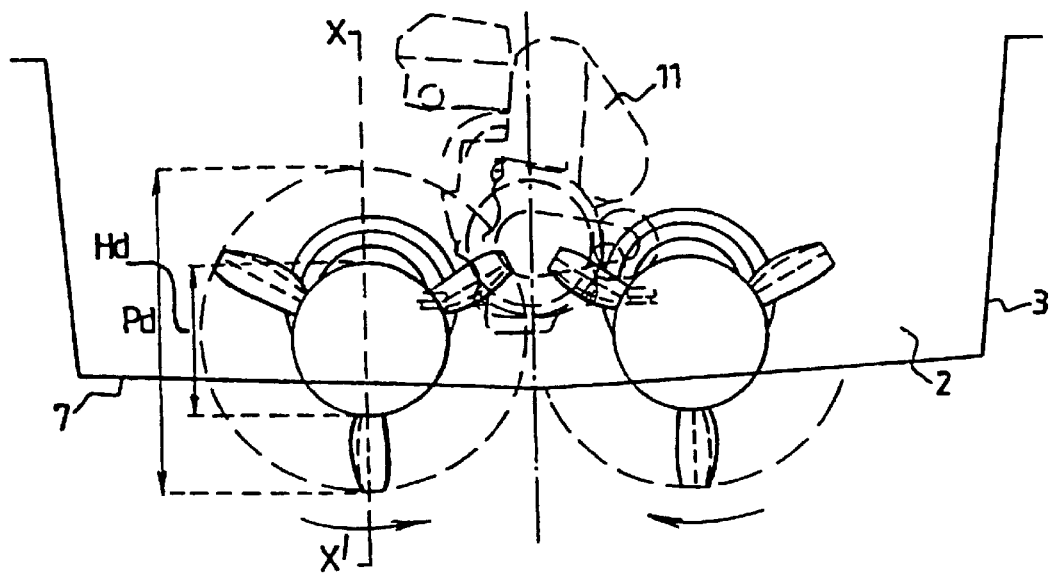
FIG. 6 is an end view of the apparatus of FIG. 2, viewed from outside the craft's hull, with the propellers in their (lowered) operational position.

An embodiment of the invention, based on the system shown in FIG. 1 but having two propellers, is illustrated in FIGS. 2–6 which show a propulsion system having twin counter rotating shafts 1 extending rearwards from the transom 2 of the hull 3 to each of which is attached a surface-piercing propeller 4 featuring a relatively large diameter hub 5 to which a number of blades 6 which are of relatively short length and of relatively narrow chord are pivotally attached. The ratio ($H_d/P_d$) of the hub diameter ($H_d$) to propeller diameter ($P_d$) is at least 0.35. The ratio (S/C) of the blade spacing to the blade chord is at least 2.0 along substantially the entire length of each blade. The propeller 4 is mounted immediately adjacent to the trailing edge 7 of the hull 3 such that it operates in the transom cavity. As above-described in relation to FIG. 1, a skirt (not shown) may conveniently be fitted to bridge any gap between the hull 3 and the blades 6 to direct the flow towards the latter. The pitch of the blades 6 is variable in both the positive and negative senses. Whilst numerous mechanical, hydraulic or electrical arrangements for controlling the pitch may be envisaged, a simple mechanical pitch control is shown by way of example. In this arrangement control rods 14, located by bushes 15 within the hollow drive shafts 1, actuate cam plates 16 mounted to the control rod by bi-directional thrust bearings 17. The blades 6 are bolted to carriers 18 pivotally contained within the propeller hubs 5 by sealed thrust and radial bearings 19. Cam followers 20 are fitted to the inward ends of the carriers 18 such that axial motion of the control rods 14 causes rotational motion of the carriers 18. The shafts 1 run in bearings in gear boxes 21 flexibly mounted to the transom 2, one of which houses a pair of inverting gears 22,23. The input shafts 2S are driven by a synchronous drive belt 27. A driver pulley 28 is directly bolted to the flywheel 29 of a combustion engine 11 (see FIG. 5). Pulleys 26 fitted to the input shafts 25 transmit the power to the gear boxes 21. The RH gearbox has a lay shaft 30 such that the RH and LH propellers turn in opposing senses. The gearboxes 21 are mounted to the transom 2 via flexible annular mountings 31 contained within an annular ring 32 bolted to the transom 2. The flexible elements 31 are arranged to take the thrust imparted by the propellers 4. The gearboxes 21 are pivotally mounted to a casing 33 which is rigidly fixed to the engine flywheel housing 34 such that they may be swung upwards to enable the craft to be beached (FIG. 4). Bushes 35, 36, 37 are arranged between the casing 34 and the gearboxes 21 to reduce friction. Actuators (not shown) may be provided fox this purpose. The drive is shown by way of example and numerous other single or multiple engine drive arrangements are envisaged.

In the embodiment of the invention illustrated in FIGS. 2–6, the hull 3 has two arcuate, convex profile projections (each having an arc of approximately 120°) which each corresponds generally to the hub of a respective one of the two propellers (see FIG. 4). With the hub of each propeller disposed opposite its respective convex hull projection this arrangement is increases the area swept out by the propeller underwater. This can, in some situations, improve the propeller efficiency. However, it will be appreciated that this type of hull profile is not practical for very high speed planing craft and for such craft no convex projections of this type would be provided in the hull 3.

Figure 7:
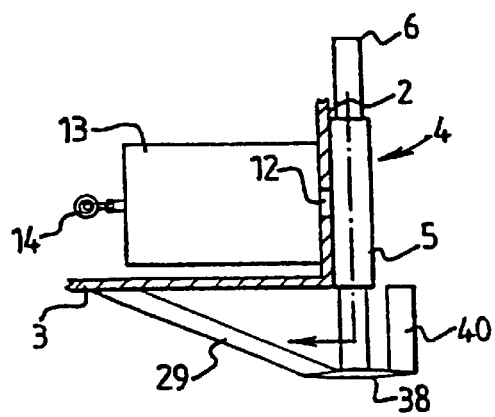
FIG. 7 is a schematic side view of a propulsion system according to a yet further embodiment of the invention.
Figure 8:
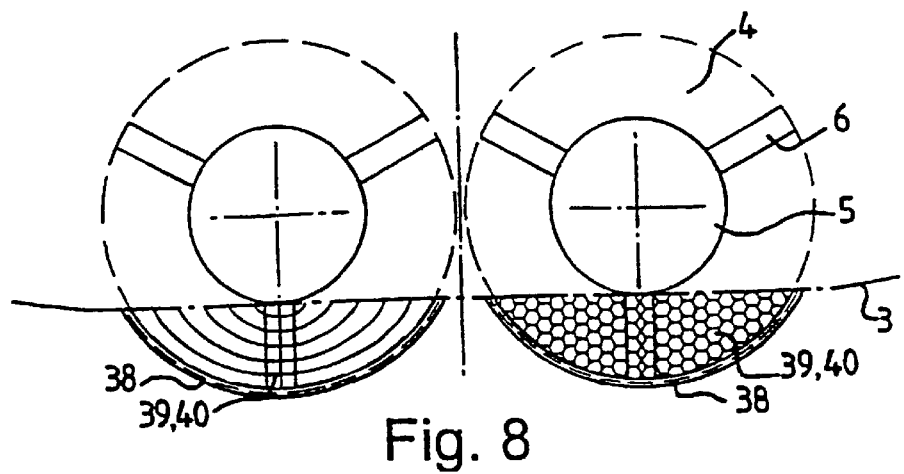
FIG. 8 is a schematic end view of the arrangement of the two propellers of the propulsion system of FIG. 7.

A preferred form of drive for small craft (e.g. jet skis) or for craft which are required to be beached is shown in FIGS. 7 & 8. This has a rotor 4 mounted directly to the motor shaft 12 and a motor casing 13 is mounted to the transom 2 of the hull 3. The motor shaft 12 is preferably hollow to allow the passage of a blade pitch control rod 14. (However, as such drives are of variable speed and reversible, the blades may in some cases be of fixed pitch). In this embodiment a metal or plastic guard 38 is fitted around a low portion of the circumference of each propeller, an inlet mesh 39 and an outlet mesh 40 being fitted thereto in front of and behind the guard respectively which serve to prevent injury and also function as flow-straighteners. The mesh may be of honeycomb or annular form or any other suitable form.

Figure 9:
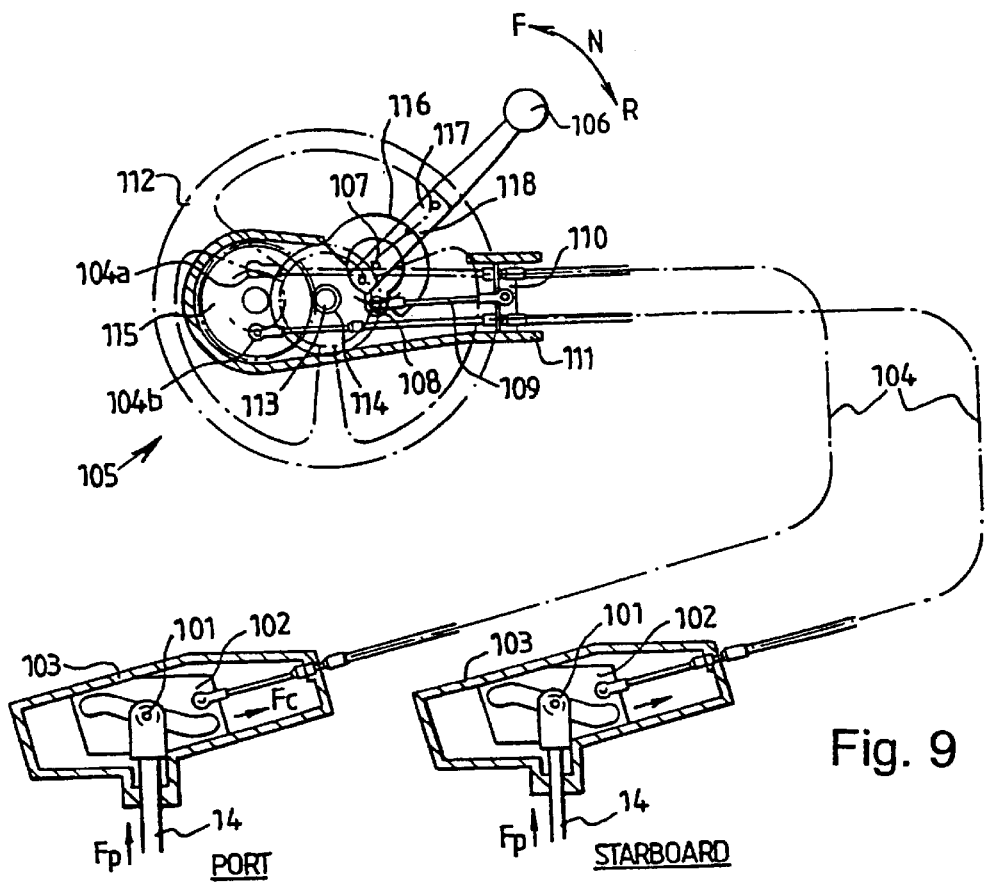
FIG. 9 illustrates a mechanical pitch control arrangement for the propulsion system according to one embodiment of the invention.

Whilst craft having twin or multiple drives may be steered by means of conventional rudders fitted behind the propellers a more effective means or steering is to differentially actuate the pitch control means such that the propeller towards the exterior of the desired turn operates at greater pitch than the propeller at the inside of the turn. The interior propeller may operate in reverse pitch for tight turns and for quasi stationary manoevres. Whilst for larger craft hydraulic or electric actuation (as described later) of the pitch control would be advantageous, a simple mechanical arrangement using pitch control rods, as described with reference to FIG. 9, can be used. For example, the two pitch control rods 14 for two respective propellers (not shown) may be fitted at their inboard ends with cam follower rollers 101 activated by two cam plates 102 which are constrained to slide in housings 103 which are fixed to the gearbox housings 21 or to the electric or hydraulic motors 13 of the embodiment of FIGS. 7–8. The housings 103 are preferably sealed by a cover (not shown). The cam plates 102 are linked by push-pull control cables 104 to a combined steering and pitch control mechanism 105.

The pitch control mechanism has a lever 106 pivoted about an axis 107 and to which is fixed a lever 108. A control rod 109 pivotally connects the lever 108 to a carrier 110 to which the outer sheaths of the control cables 104 are fixed. The carrier 110 is constrained to slide in a housing 111. The lever 106 is shown in the neutral position. Rotation of the lever 106 in the direction of the arrow F in FIG. 9 will displace the carrier 110 causing an equal extension of the two cables 104 causing the cam plates 102 to move in the direction of arrows $F_c$ and movement of the two pitch control rods 14 in the direction of the arrows $F_p$. Movement of lever 106 in the direction of arrow R will cause the inverse effect. A friction slipper 117 pivotally attached to the lever 106 locks against a segment 116 fixed to the housing 111 to prevent reaction forces from the steering mechanism from altering the pitch control setting. A neutral detent position 118 is incorporated into the segment 116.

A steering wheel 112 (shown in hatched outline) is fitted to a shaft 113 which is free to rotate in bearings retained within the housing 111. A pinion 114 on the steering shaft 113 drives a gear 115 to which ball joints 104a,104b fitted to the ends of the inner cables 104 are fixed. Clockwise movement of the steering wheel causes anti-clockwise rotation of the gear 114 resulting in retraction of ball joint 104b and extension of ball joint 104a which, in turn, results in movement of the pitch control rod 14 in the direction of arrow $F_p$ on the starboard side and in the inverse direction on the port side.

Due to the additions of the cable extension due to the pitch control and the steering settings, it may be necessary to limit the stroke of the pitch control rods 14 by profiling the cam plates 102 as shown. The housing 111 may conveniently be fitted with a cover (not shown).

It will be noted that the above-described propulsion system has simple passage of the drive shaft(s) through the transom—the shaft seal is thus subject to only small pressure head, and may, in many instances, be arranged above the static water line of the craft. Moreover, only a minimum of gearing is required—the propeller shaft runs in low friction rolling bearings, no external water lubricated bearing being required. Also, the propeller being fitted immediately adjacent to the hull trailing edge means that it operates in the uniform wake field of the hull where the water level is relatively low even at low craft speeds.

Figure 10A:
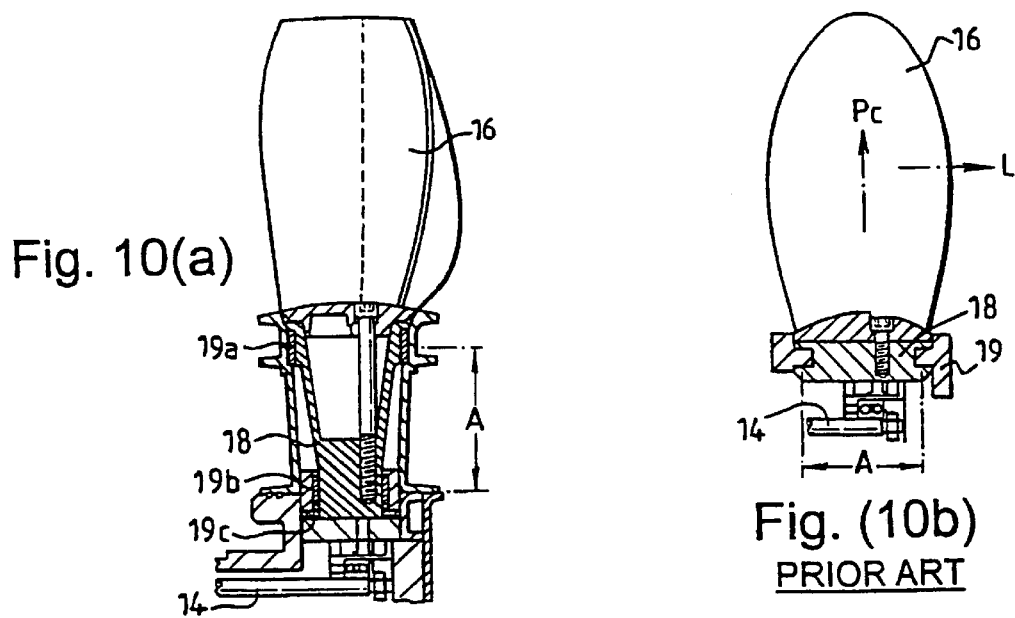
FIG. 10(a) is a cross-sectional side view of a portion of a propeller of the propulsion system of FIG. 1 or FIG. 2.

Another advantage of the new propulsor is that due to the large hub diameter the spacing, A, of the bearings 19a, 19b which support the blade carriers 18 can be widely spaced, as shown in FIG. 10(a). These bearings have to take the very high thrust forces and moments due to the lift load L generated by the propulsor blades 16, as well as the control force in the control rod 14. The arrangement allows the use of needle roller, or other rolling bearings. The thrust bearing 19c takes the smaller centrifugal load Pc. Additionally, the efficient cavitating sections have a centre of lift which is usually somewhat behind the mid-chord position. The blades can be arranged such that centre of lift lies on the pivot axis of the blades. The resulting control forces are low such that the control system power is minimised.

In contrast, the bearing arrangement of a conventional variable pitch propeller is shown in FIG. 10(b) in which the blade carrier 18 is supported by a combined thrust and journal sliding bearing 19. For this case, the journal bearing supports the lift load L and the control force in the control rod 14, whilst the thrust bearing takes the moment generated by the lift force L as well as the centrifugal force Pc. It will be evident that the smaller spacing A will result in higher forces resulting from the high moment generated by the blade and that this together with the substantially higher frictional forces will result in control forces which are at least an order of magnitude higher than is the case for the new propulsor. This is further aggravated by the fact that the centre of pressure is at about the 25% chord point, such that the centre of lift cannot normally be arranged on the pivot axis. The high forces and the inherent 'stick-slip' engendered by the sliding bearings result in high control system power with substantial hysteresis effects.

Because of the fact that the pitch can be optimally controlled, the choice of blading becomes less critical than for a fixed pitch propeller and the variation of performance between laden and unladen conditions, etc., is considerably less marked. This is a major factor as the choice of propeller is an imprecise art and the majority of boats and ships in service are fitted with propellers which are far from optimised. Frequently propellers have to be selected on a trial and error basis. Additionally, because the pitch can be optimally controlled with the present invention, only a restricted range of replacement blades is required to cover a wide range of applications, reducing stock-holding costs compared to conventional propellers.

The propeller is also relatively large compared with prior known propellers for given sizes/types of craft. For example, for a fast (40 knot), 30,000 tonne cargo ship the diameter of the propeller (at the blade tips) might be approximately 10.8 m, with the hub diameter being approximately 4.3 m of that (and the static hull draught being approx. 4 m). A conventional, submerged propeller for this type of ship would commonly have a propeller diameter of 8 m with a hub diameter of 1 m. Similarly, for a 35 knot leisure fishing boat the propeller of the invention might have a propeller diameter of approximately 530 mm and a hub diameter of 195 mm (with static hull draught of 200 mm), while a conventional submerged propeller for the same boat would generally have a propeller diameter of 330 mm, and a hub diameter of 90 mm. For a small, lightweight hydroplane the propeller of the present invention might have a propeller diameter of 385 mm approx. and a hub diameter of 192.5 mm (static hull draught 25 mm), while a conventional surface propeller for such a craft would have a propeller diameter of approx. 200 mm and hub diameter 50 mm.

For the above-mentioned fast cargo ship the twist of the blades of a propeller according to the present invention would be approximately 18.7°, with the ratio (S/C) increasing from 2.18 at the root of the blades to 5.17 at the blade tips, the chord (C) increasing up 75% of the length of the blades and decreasing to the tip.

For the 35 knot fishing boat the twist of the blades (of a propeller according to the invention) would be perhaps up to 25°, the ratio S/C increasing from 3.18 at the root, through 4.45 at 60% of the propeller diameter, to 8.75 at the blade tips, the chord (C) again increasing up 75% of the length of the blades and decreasing to the tip. For the lightweight hydroplane the twist of the blades would be perhaps approx. 12.8°, the ratio S/C increasing from 3.6 at the root, through 5.44 at 75% of the propeller diameter, to 6.99 at the blade tips.

The propeller being of large diameter, and being located close to the trailing edge of the hull, means that a proportion of the surface swept by the blades remains above the water level even when the craft is stationary or moving astern, so that ventilated cavitational flow around the blades can be maintained under such conditions—the propellers can thus continue to rotate at their maximum speed even for tight manoeuvres and when stationary. This maintained cavitational flow also obviates the requirement for a clutched drive. The blades may be maintained in a neutral position such that each blade runs in the cavity created by the previous blade allowing a positive neutral to be maintained. Electronic/hydraulic or electronic/electrical control systems linked to GPS receivers can also be provided to enable the craft to be maintained in a geo-static position.

The fact that the diameter is large also increases the swept area relative to a standard propeller whilst at the same time reducing draught. This feature reduces slip (and hence increases efficiency) markedly. This is particularly marked in the preferred case in which two propellers are fitted. (Being transom mounted there is little physical limitation in propeller diameter).

Figure 11:
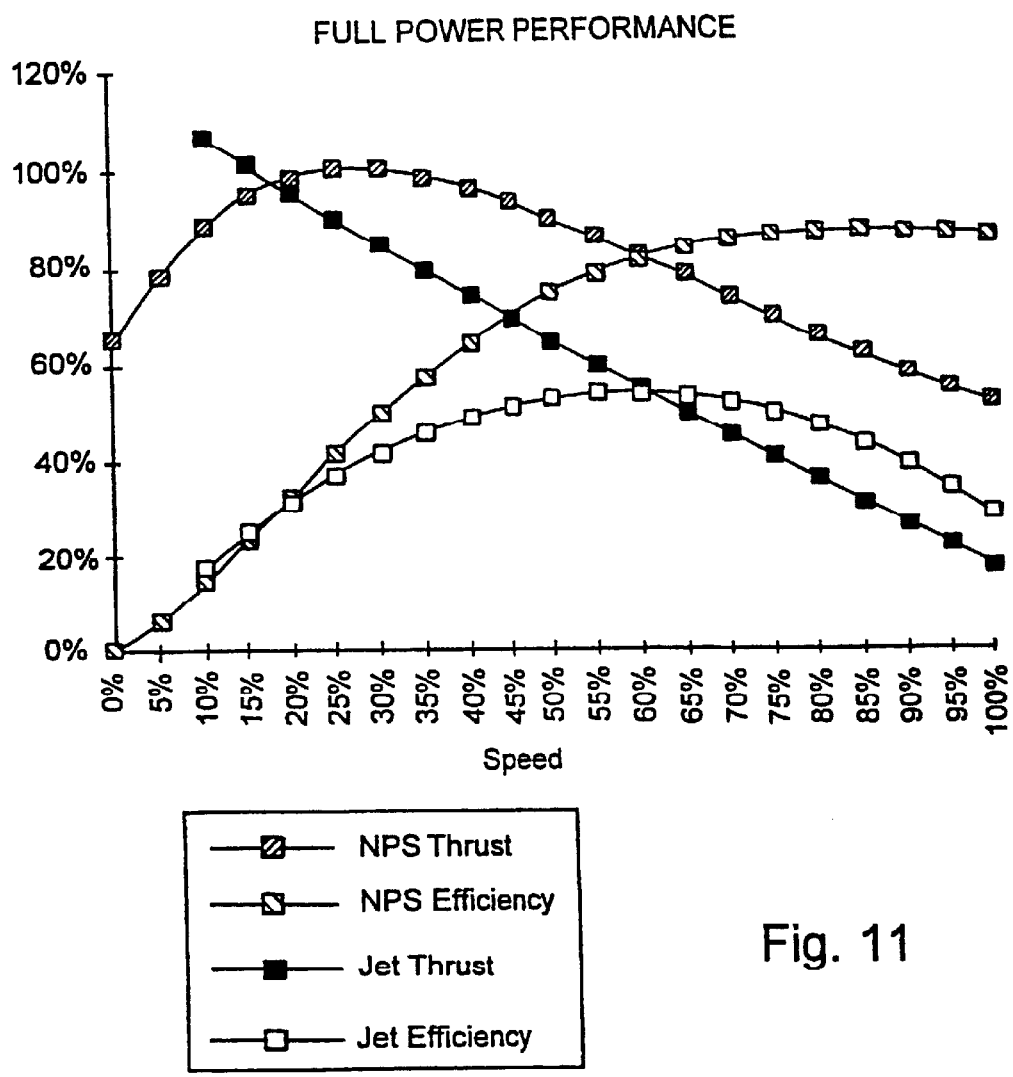
FIG. 11 is a graph comparing thrust and efficiency of the new propulsion system (NPS) illustrated in FIG. 1 or FIG. 2, with a conventional jet propulsion system.

The fact that the craft can accelerate from rest at maximum engine speed together with the large propeller diameter as well as the fact that the blades can be optimally oriented for any particular condition means that the blades can be of low chord and also that the lift coefficient can be maintained at a moderate level. This overcomes one of the major draw-backs of conventional surface-piercing propellers in that the spacing of each blade relative to the cavity behind the preceding blade can be relatively large. Moreover, the low speed thrust is exceptionally high compared to other propulsion systems and at moderate speeds (see below), which may be tailored to correspond to on-the-plane speed, the thrust is considerably higher than for other propulsion systems. This is illustrated in FIG. 11 which is a graph comparing the predicted thrust and efficiency of the new propulsion system (NPS) as above-described, and a typical conventional jet propulsion system.

The infinitely variable forward and reverse drive obtained by the pitch control mechanism allows very easy manoeuvring in port and at high speed drag is substantially reduced by the lack of rudders. The installed length of the propulsion, engine and drive can be considerably shorter than for other propulsion systems, and the weight can be lower. The weight distribution is ideal for fast craft. Manufacturing costs are comparable with conventional propeller and shaft arrangements and substantially lower than for Z-drives or hydrojets.

As an aid to understanding some of the benefits of the aforementioned propulsion system, some of the problems of conventional surface drive systems and the beneficial features of the present invention are described hereunder, with reference to FIGS. 12–17.

Figure 12:
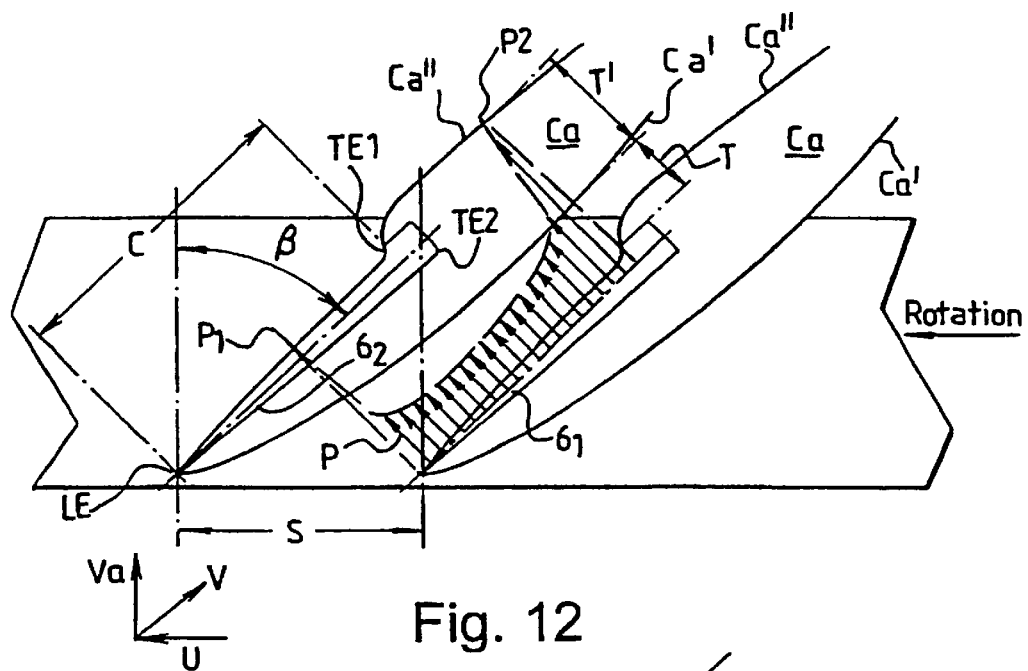
FIG. 12 is a schematic representation of a two-blade section of a conventional, fixed blade pitch, surface propeller operating at high power, the two blades being shown in cross-section at a radius R from the centre of the propeller.
Figure 13:
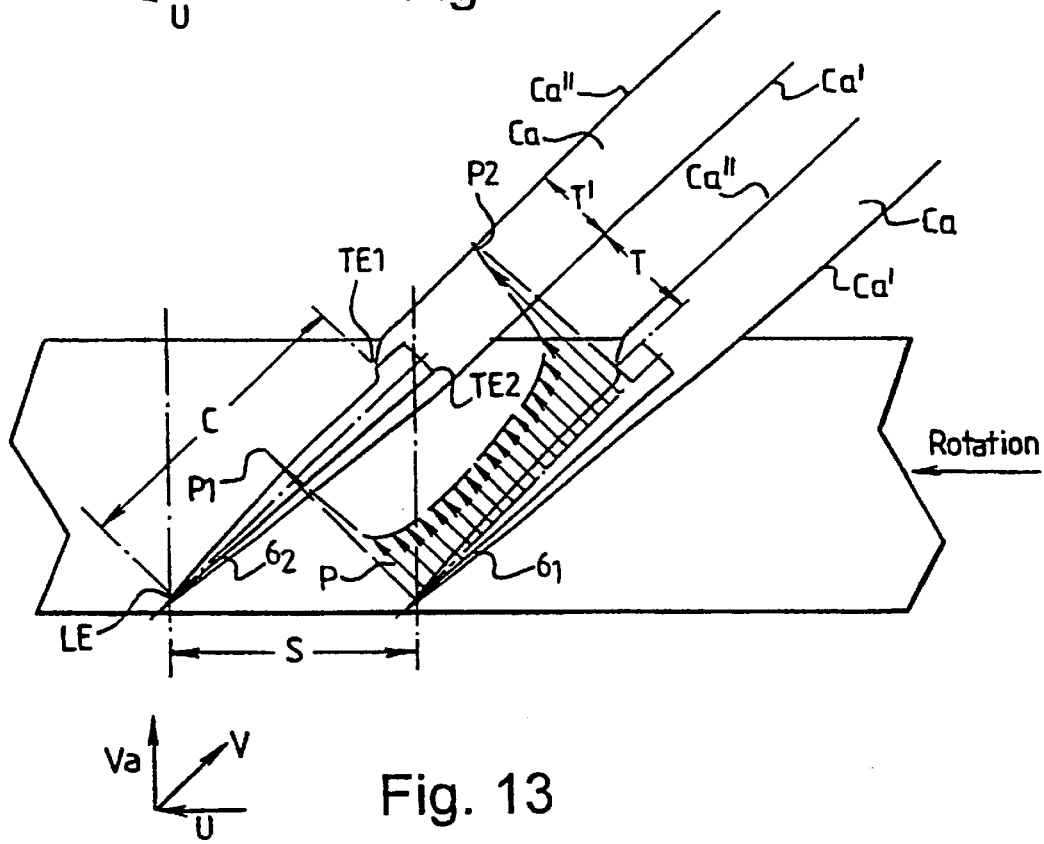
FIG. 13 is a schematic representation of the same two-blade section of the propeller as in FIG. 12, operating at cruising speed.

FIGS. 12 and 13 show a surface piercing propeller of known, conventional type in which a section at a particular diameter is shown flattened out. The blades are of fixed pitch, being inclined to the longitudinal axis of the propeller at an angle β and have a blade chord C and a blade spacing of S wherein the ratio S/C is of the order of unity. In each case two fully submerged blades are shown and any partially or unsubmerged blades are omitted. The blade cavity $C_a$ created by each blade has a rear side defined by a vapour/liquid boundary $C_a'$ formed where the water detaches from the leading edge LE of the blade, and a forward side defined by a further vapour/liquid boundary $C_a''$ formed where the water detaches from an effective trailing edge TE1 of the blade. The surface extending from the leading edge LE to the effective trailing edge TE1 of each submerged blade is fully wetted whilst the back face extending from the leading edge LE to the (actual) trailing edge TE2 of each blade is only in contact with the vapour/air mixture in the blade cavity $C_a$. A pressure coefficient distribution P along the wetted surface LE-TE1 has a sharp peak P1 at a stagnation point close to the leading edge and a further, broader, peak P2 close to the trailing edge. The pressure coefficient distribution shown in FIGS. 12 and 13 is for an efficient blade form in which the centre of pressure is well toward the effective trailing edge TE1 of the blade. Less efficient blade forms show a less pronounced secondary peak P2, or may have no secondary peak at all. Va is the axial velocity through the area swept by the blades and is the sum of the craft speed and the slip (or the additional axial velocity created by the propeller). U is the tangential velocity difference between the tangential velocity of the blade due to its rotation, and the swirl velocity of the incoming water. The resultant relative velocity is V. The lift L, and drag D generated by an incremental section of span δH are given by the equations:

$$L=\rho w.(V^2/2).CL.C.\delta H$$

and $$D=L/(CL/CD)$$

where ρw is the density of water, CL is the local 3-dimensional lift coefficient and CL/CD is the ratio of the local lift coefficient to the drag coefficient, and C is the blade chord.

The thrust T generated by this incremental section and the power W absorbed are given by the equations:

$$L.\sin(\beta)-D.\cos(\beta)$$

and $$W=U.[L.\sin(\beta)+D.\cos(\beta)]$$

FIG. 12 shows the propeller operating at high power and at relatively low boat speed but after full ventilation of the blades has been established. In this case Va is low and if the propeller is not to operate at an exceptionally high angle of attack (leading to high power absorption), U must also be low, and the resultant relative velocity V is thus also low. For high power at a low value of U the lift L must be high and as V is also low CL must be high. The combined effect is that the cavitation No.(σ) will be high and the cavity $C_a$ very thick. Under these conditions the ratio of lift to drag falls away such that the blade generates considerable drag.

It is evident from FIG. 12 that the lift (represented by the pressure coefficient curve P) generated by blade $6_l$ will be diminished by the fact that it is acting in close proximity the cavity wall $C_a'$ which will lead to deformation of the wall. The result is to diminish the lift L whilst for constant input power the drag D will further increase resulting in a significant reduction in thrust. The extent to which the lift is reduced and to which the cavity wall is deformed depends on the ratio of the local fluid stream T to the cavity thickness T'. Under conditions where the blades are relatively closely spaced and where the cavity is relatively thick (as in conventional systems) the reduction in thrust due to the above mentioned conditions can be very high.

The effect of the low value of U on engine torque and on thrust produced depends to a considerable measure on the distance between the rear of the hull and the propeller. In the case where a fixed pitch propeller as in FIG. 12 is arranged immediately behind the trailing edge 7 of the hull 3, the hull acts as a flow guide and entry to the propeller follows the longitudinal contours of the hull. Under these conditions the swirl velocity of the incoming water is zero and the value of U is governed uniquely by the rotational velocity of the propeller. Most engines deliver little power at low speeds and under these circumstances the angle of attack will increase until the delivered engine power is absorbed. The engine will labour whilst the propeller delivers little thrust and the craft will be unable to gain speed.

For this reason, the majority of surface drives are arranged with the propeller well behind the trailing edge 7 of the hull 3, for example with the propeller arranged at least 5%–10%, say, of the length of the craft behind the transom, and/or at a distance of between 35% and 180% of the propeller diameter behind the transom. In such an arrangement the water Can swirl to enable the propeller to run faster for a given value of U. This in turn enables the engine to deliver more power although even in this case acceleration is poor and considerable churning losses are generated.

FIG. 13 shows the same section of propeller at cruising speeds In this case the angle of attack and the lift coefficient are considerably reduced and U, Va, and V are considerably higher such that the cavitation N° (σ) is much reduced, and the cavity $C_a$ is much finer. The thickness T of the fluid stream relative to the cavity thickness T' at any point is much reduced such that the reduction in lift, the deformation of the cavity wall $C_a'$ and the resulting increase in drag is also considerably reduced.

Due to the reduced cavitation number (σ) and angle of attack as well as the distortion of the cavity boundary $C_a'$ due to the lift generated by the following blade, the cavity thickness at the trailing edge TE2 and at speeds around the design speed the low cavitation number and the low angle of attack result in a thin cavity with little clearance between the trailing cavity boundary and the trailing edge of the blade. At some speed a little above the design speed, the pressure distribution of the succeeding blade will distort the said cavity boundary such that it re-attaches to the back face of the blade (LE-TE2) resulting in a dramatic increase in drag. This explains the rapid fall away in the efficiency above design speed for fixed pitch propellers.

Figure 14:
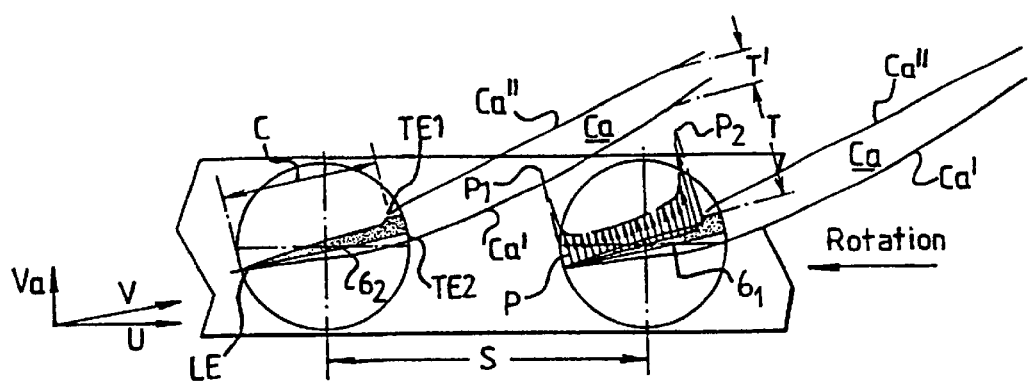
FIG. 14 is a schematic representation of a two-blade section of a propeller of the propulsion system of the invention operating at slow (cruising) speed, the two blades being shown in cross-section at a radius R from the centre of the propeller.

The slow speed case for an improved propeller according to the present invention is shown in FIG. 14. In the illustrated case the blade chord C is small and the spacing S quite large such that the ratio S/C may be 2.3 or greater, depending on the required performance characteristics. The blades are pitched to an angle ($\beta$) which is considerably higher than for the fixed pitch blade and may reach 78° to 80° at very low speeds. This allows a high constant tangential speed U to be maintained such that the relative velocity V is also high and by consequence the lift L can also be high without running the blade at an excessive angle of attack with the resulting high losses. This results in a relatively low cavitation number ($\sigma$) and the cavity thickness remains small. The fact that the following blade $6_2$ is now some distance behind the preceding blade $6_1$ allows the cavity to bend away under the influence of the pressure field P generated by the following blade $6_2$ and the resulting ratio of the thickness of the fluid stream T to the cavity thickness T' at any point is substantially improved compared to the case shown in FIG. 17. The distortion of the pressure coefficient curve P and the resulting losses are very significantly reduced. A propeller of this configuration can beneficially be positioned immediately behind the trailing edge 7 of a hull 3 (providing improved performance for the reasons previously described) as no swirl velocity is required to align the flow into the propeller.

For such a case, the lift L is high, the drag D is low and the angle $\beta$ approaches 90°. From the above equations for power absorbed and thrust it will be evident that this arrangement maximises thrust for a given power, and as the engine can be arranged to operate at optimum speed, the full engine power can be absorbed with no churning or other major losses.

Figure 15:
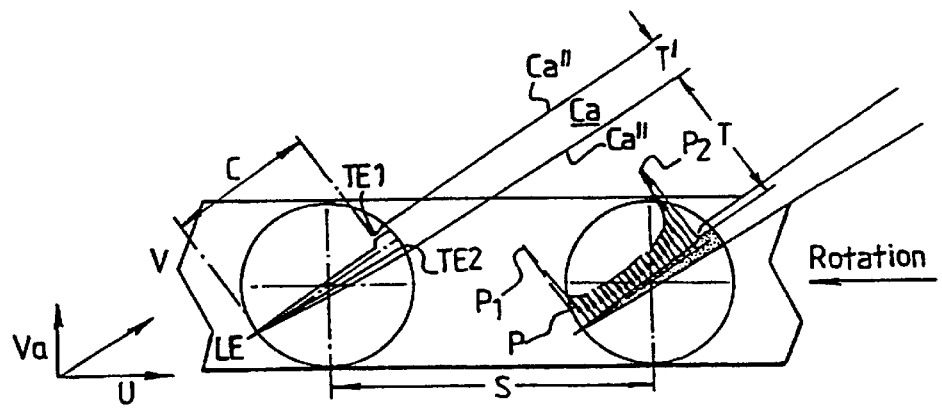
FIG. 15 is a schematic representation of the same two-blade section of the propeller as in FIG. 14, operating at high speed.

The high speed case for such a propeller is shown in FIG. 15, from which it is evident that the pressure coefficient distribution P will be little effected by the cavity behind the preceding blade due to the high ratio T/T'. The blade can operate at a high constant value of U and the blade angle $\beta$ can be optimised to give optimum thrust under any desired design condition. With the pressure field of the following blade operating well behind the trailing edge of the preceding blade, coupled to the fact that the blade angle can be adjusted to suit flow conditions, re-attachment of the upper cavity $C_a'$ to the back surface LE-TE2 of the blade can be delayed allowing a wider operating range.

Figure 16:
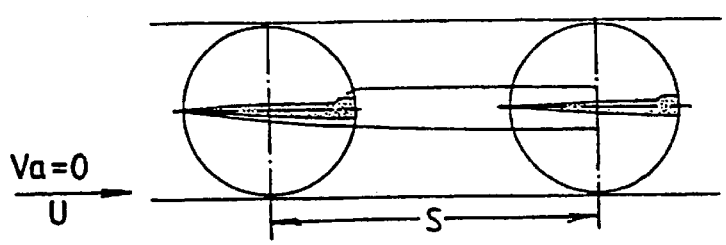
FIG. 16 is a schematic representation of the same two-blade section of the propeller as in FIG. 14, operating at zero thrust.
Figure 17:
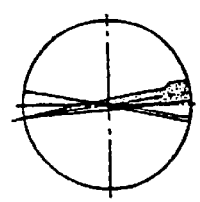
FIG. 17 shows the cross-section of one of the blades of FIGS. 15 and 16 at different radii, illustrating the twist in the blade.

FIG. 16 shows the principle used to obtain zero thrust in which each blade operates within the cavity behind the preceding blade. Although a 100% neutral requires an active control coupled to a GPS system or to a thrust sensor, the net thrust for small deflections either side of the balanced thrust position is very small due to the proximity of the thick cavity. Due to the twist of the blade shown in FIG. 17, the inner and outer extremities of the blade will generate small amounts of balanced positive and negative thrust.

Figure 18:
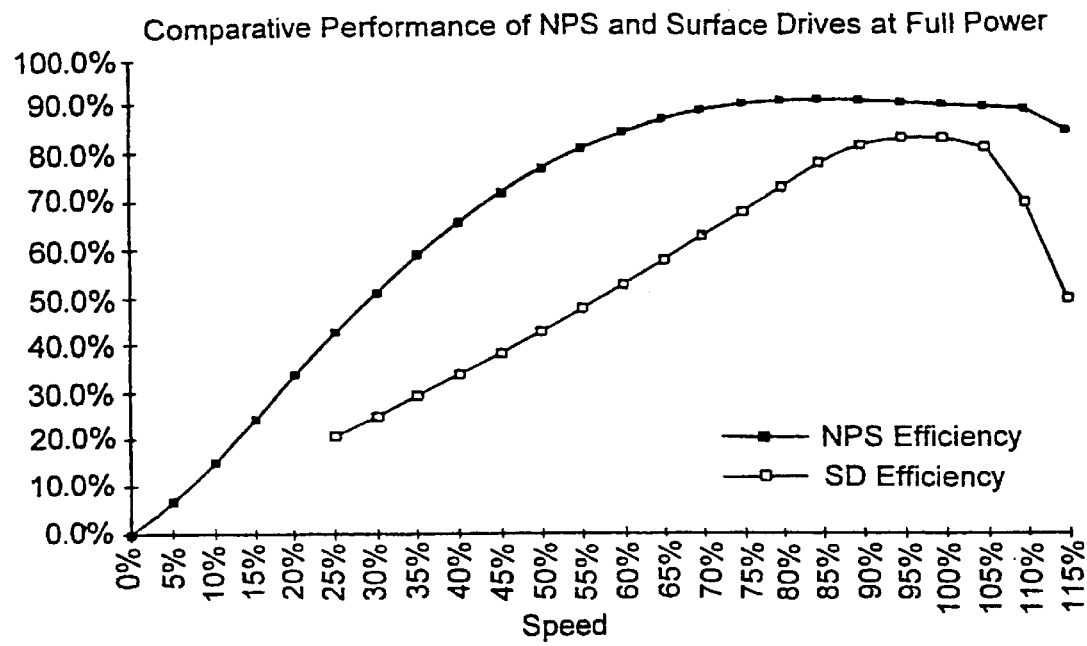
FIG. 18 is a graph comparing the efficiency of the new propulsion system (NPS) plotted against speed, with the efficiency of a prior art surface-piercing propulsion system plotted against speed.
Figure 19:
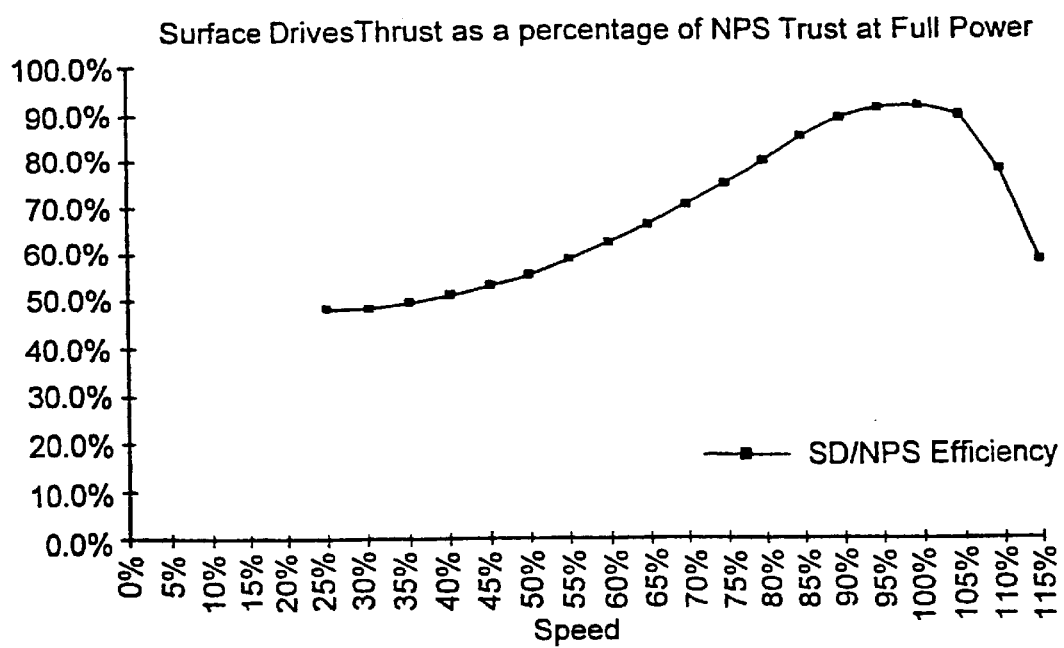
FIG. 19 is a plot of the efficiency of the new propulsion system (NPS) against the efficiency of the said prior art system.

FIG. 18 shows the predicted efficiency curves of the propulsor according to the present invention, and an inclined raked (fixed geometry) propeller of known type disclosed in U.S. Pat. No. 3,938,463. Both systems are optimised for 80 knots maximum speed. FIG. 18 shows the ratio of the two efficiencies which clearly shows that whereas the maximum efficiency of the new propulsor is 8% higher than for the raked propeller at the design speed, at other speeds the difference is much more marked. Of particular importance to planing craft is the efficiency at planing speed and here it is evident that the propeller of U.S. Pat. No. 3,938,463 has only 50% of the efficiency of the new propulsor.

The very substantial improvements in efficiency for high speed craft offered by the propulsion systems according to the above-described embodiments of the invention allow the fitting of substantially smaller (and lighter) engines for identical performance. The substantial fuel consumption savings further reduce craft weight as well as installation and operating costs. The simple arrangement minimises maintenance and increases reliability. In most cases the blades can be individually changed and the propeller can be rotated such that this operation can be undertaken above water level. This is especially important for large commercial craft for which a propeller is normally undertaken in dry dock and for which the manufacturing time for a new propeller requires that a reserve propeller is frequently kept aboard.

Also, being "shaded" by the hull, the propeller hub may be reduced marginally in diameter compared to its theoretical diameter such that any change in form of the hub due to blade rotation is of reduced significance.

It will be appreciated that the facility to vary the pitch of the blades in order to achieve maximum thrust when required, or maximum operational efficiency etc., is an important aspect of the preferred embodiment of the invention. There now follows a detailed description of an intelligent transmission controller system suitable for use in the propulsion system according to the invention, for achieving intelligent blade pitch control. The accompanying FIGS. 20–27 will be referred to in connection with the following description.

Figure 20:
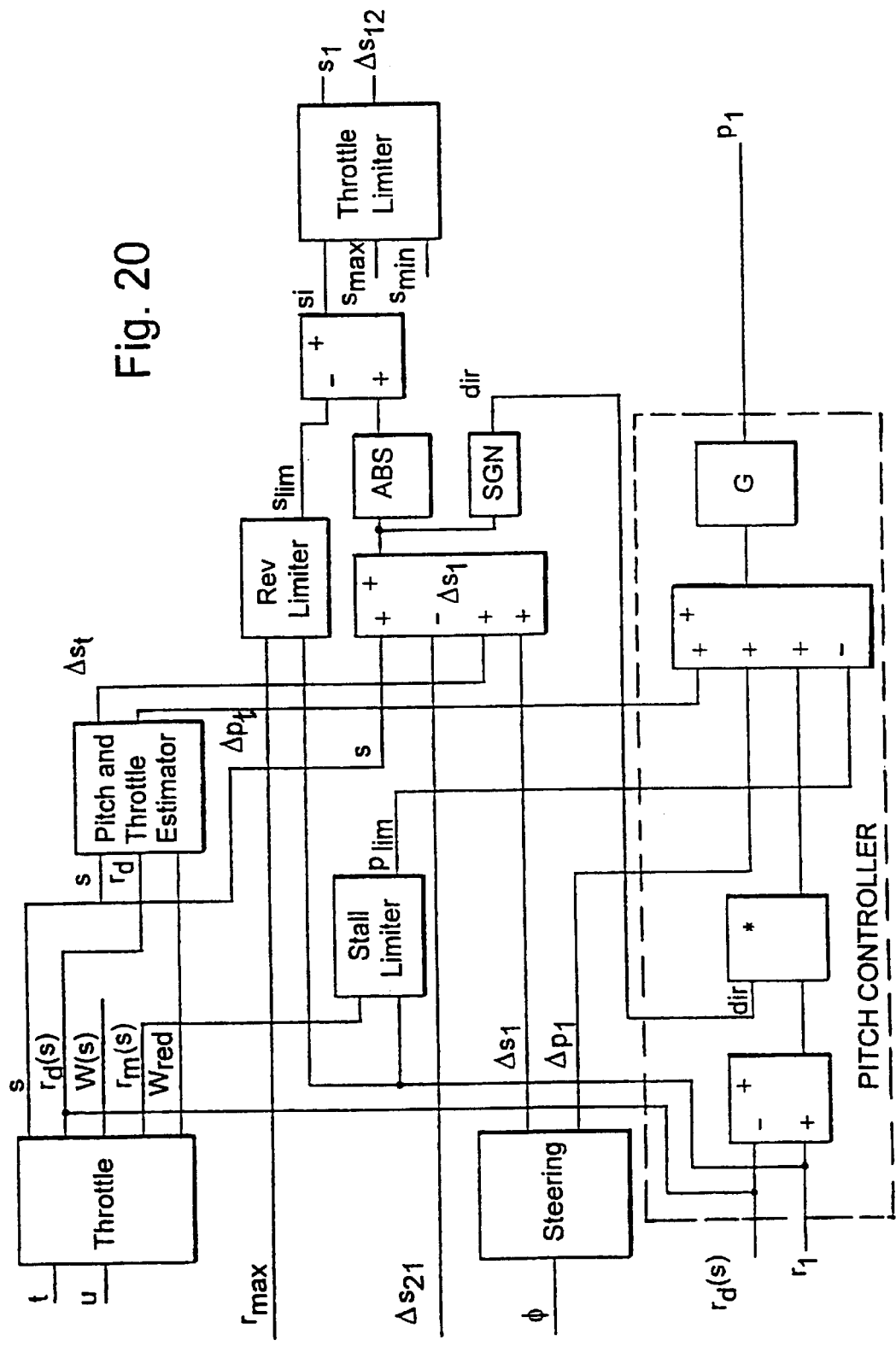
FIG. 20 is a block diagram illustrating a transmission control system incorporated in a preferred embodiment of the invention.
Figure 21:
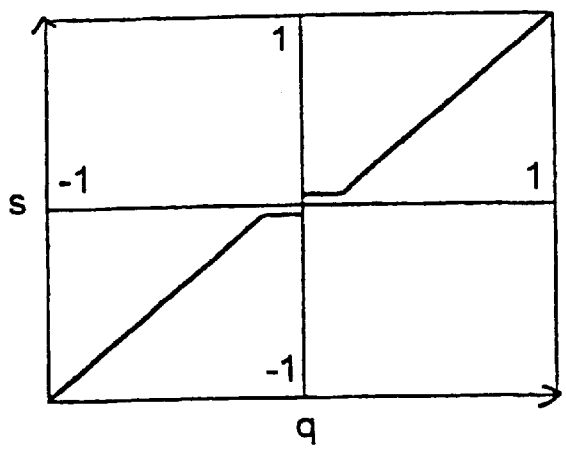
FIG. 21 is a graph of the engine throttle position s, plotted against the main throttle control position q, in the system of FIG. 20.

FIG. 20 illustrates schematically a control system for a twin diesel-engined craft in which each engine drives a single rotor propulsor, FIG. 20 showing only the control system for a single engine and a single propulsor (for clarity). The rotation of the two propulsors is opposed. The pitch of the blades of each propulsor is varied by an electric actuator fitted with a feed-back device. The engine throttles area also controlled by actuators with position feed-back. Each variable speed engine is controlled independently.

| | Variables: |
|---|---|
| q | main throttle control position |
| u | secondary throttle control position |
| s | engine throttle position |
| p | pitch angles |
| r(s) | measured engine speeds |
| $r_d$(s) | controlled engine speeds |
| $r_m$(s) | engine speed for maximum power at s |
| r' | engine acceleration (dr/dt) |
| w(s) | maximum power outputs at r(s) |
| $w_{max}$, r($w_{max}$) | maximum power, engine speed at maximum power |
| dir = ±1 | motion ahead or astern |
| ±$\phi$ | steering wheel angle from straight ahead |
| V | craft speed |

The above variables are used in FIGS. 19–26.

Functioning

Control Modes

The transmission controller operates in three basic control modes.

1. Engine speed and craft speed are dependently controlled

In this case both craft and engine speed, acceleration, fore/aft motion, and engine loading, are controlled using the engine throttle controls.

2. Engine speed and craft speed are independently controlled

In this mode the engine speed is set to some desired value using a separate throttle control. The craft speed, acceleration and direction, as well as potential over-loading of the engines are controlled by varying the pitch of the propulsors. Typical examples for this mode of control could be:

2.1. For manoeuvring in port the engine speed may be set to some value at which sufficient power is available for all anticipated manoeuvres.

2.2. Under cruising conditions, the engine speed may be set to some optimum value for fuel consumption, or to satisfy particular noise or vibration criteria.

2.3. For a power boat, maximum power engine speed may be selected to provide maximum acceleration at all times.

3. Mixed control

In mode 2, if the pitch is set to a value which causes overloading of the engines, the pitch is reduced to prevent this happening. In the mixed control mode, the engine speed would be increased in this case.

The control system has a single lever controller which in mode 1 sets the throttle settings of the two engines (and by consequence the engine speeds and the propulsor pitch settings) and the direction (ahead or astern).

In modes two and three, a separate engine throttle control sets the throttle position, whilst the single lever control controls the pitch and the direction (ahead or astern). In mode three, if the control lever is set such that engine speeds higher than that set by the engine throttle is required, then the single lever control also controls the engine speed.

Throttle Control

The throttle, q, controls the accelerator input (carburettor butterfly, diesel pump rack, or electronic input) at the engine, s, according to the expression $$s = f(q)$$

where f is some desirable function. A possible function, illustrated in FIG. 21, would be:

$$s = \max(s_{min}, |q|)$$

At s, the engine is optimally controlled to operate at a design speed $r_d$, and gives a maximum power $W_{max}$ at an engine speed of $r_m$. Depending on the range of operating conditions more than one "$r_d$ against s" curve may be required in order to maximise usage of the available power while maintaining sufficient dynamic reserve, or in order to maximise efficiency in different loading/sea states.

Figure 22:
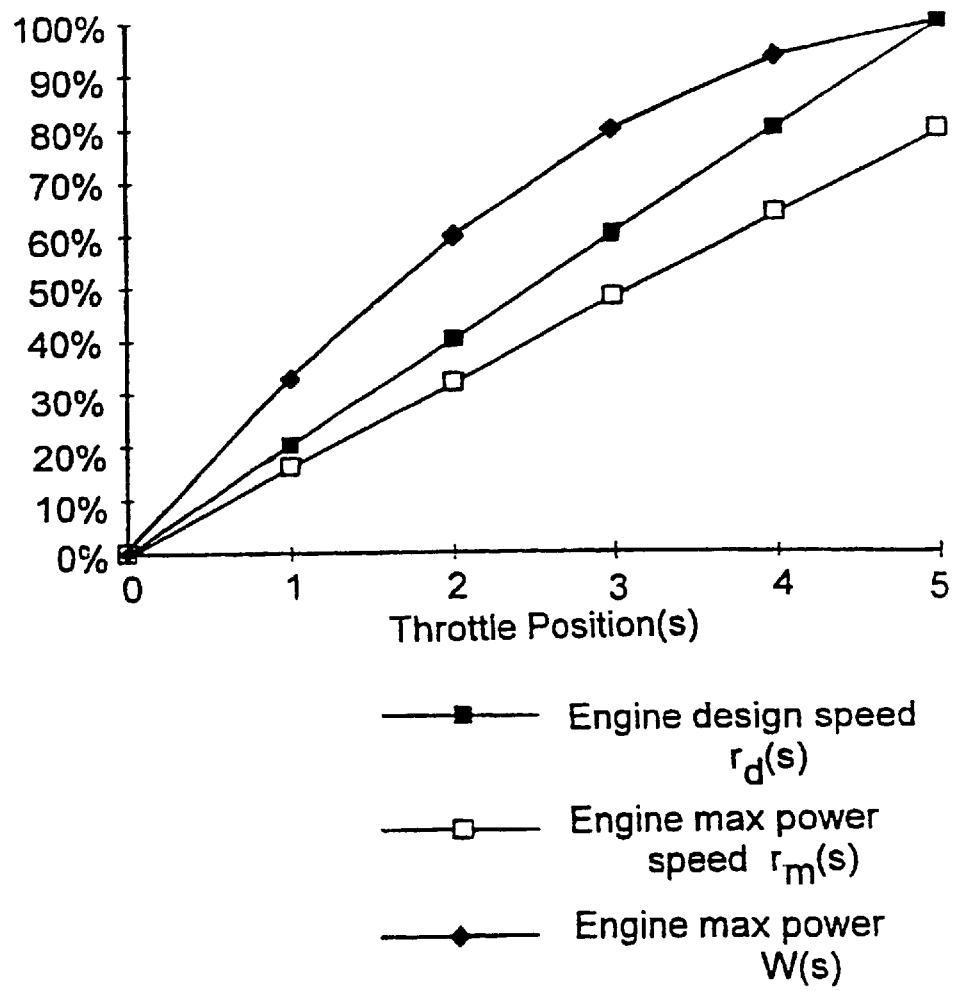
FIG. 22 is a graph comparing engine design speed $r_d(s)$, engine maximum power speed $r_m(s)$, and engine maximum power $W(s)$.
Figure 23:
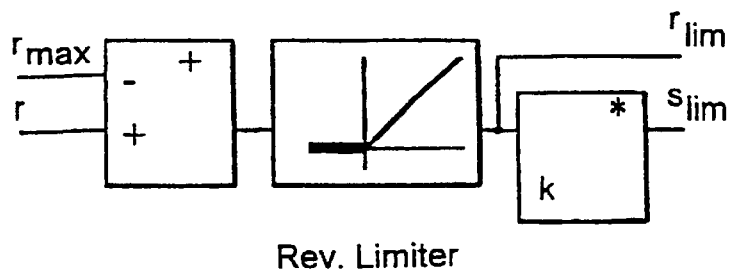
FIG. 23 is a block diagram of an engine motor rev. limiter arrangement of the system of FIG. 20.

The engine delivers its maximum power, W at an engine speed of $r_m$. A graph comparing $r_m(s)$, $W(s)$ and $r_d(s)$ is shown in FIG. 22.

In order to control the engine speed to its controlled value $r_d$, the difference between the measured speed, r, and the controlled speed is fed back into the pitch controller (as illustrated in FIG. 20). If the engine is turning too fast the pitch is increased, loading the engine and causing it to slow. If the engine speed is too low the pitch is reduced, reducing the engine load and allowing the engine speed to increase.

In the case where independent control of the motor and boat speeds is possible, then the speed of the motor is set as a function of a secondary throttle, u: $r_d = r_d(f(u))$. The main throttle then reduces or increases the engine throttle position allowing a reduction or increase in the pitch of the propulsor while maintaining constant motor speed, $r_d$.

In order to vary the power at constant motor speed, we need data for throttle against power settings at constant speed. This takes the form of a series of curves, which is readily derivable from motor manufacturer's data. We also need to have estimates for the change in power consumed related to changes in propulsor pitch. These characteristics are maintained in the Pitch and Throttle Estimator (see FIG. 20). Since any errors are corrected by the motor speed-pitch feedback, great accuracy is not required and a set of values at nominal design conditions ($r_d$, s) is sufficient.

Figure 24:
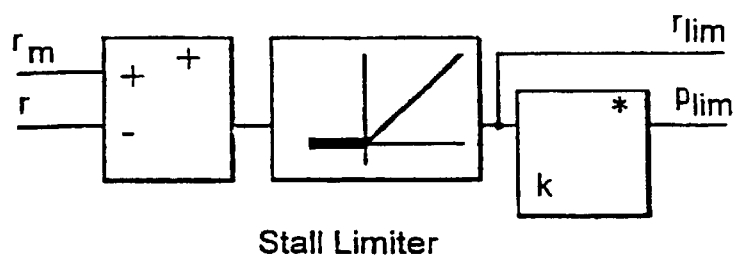
FIG. 24 is a block diagram of a stall limiter arrangement of the system of FIG. 20.
Figure 25:
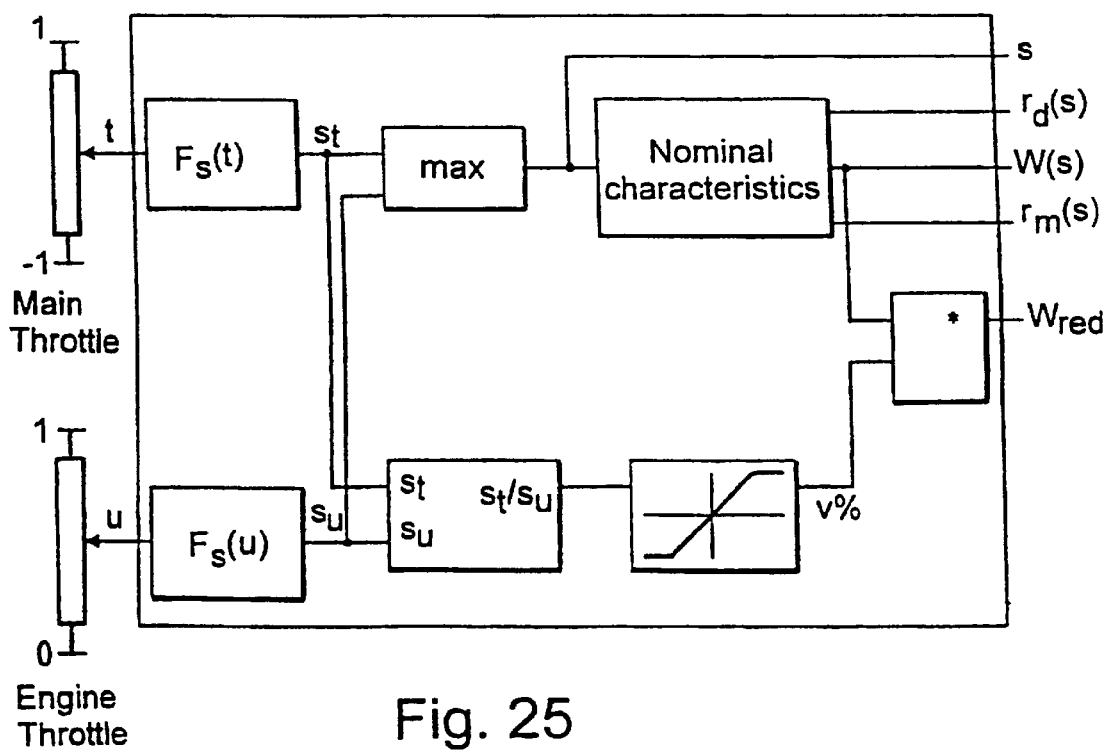
FIG. 25 is a block diagram of a throttle arrangement of the system of FIG. 20.
Figure 26:
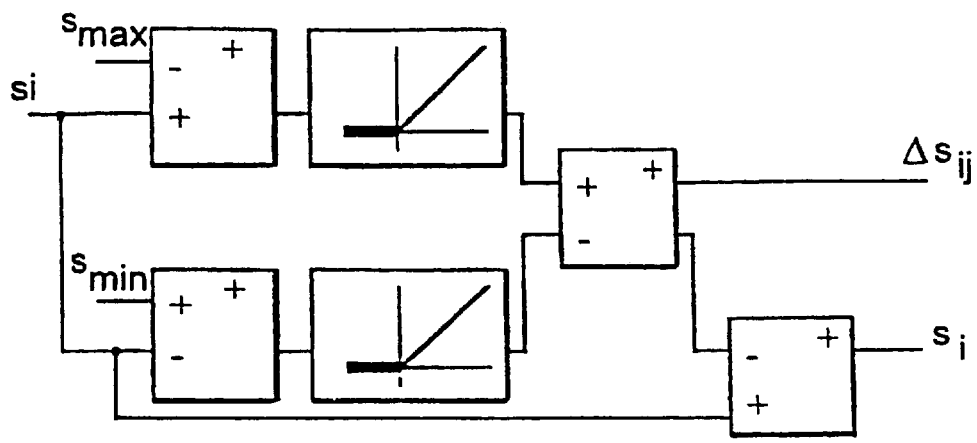
FIG. 26 is a block diagram of a throttle limiter arrangement of the system of FIG. 20.

The maximum motor speed is limited by rapidly reducing the throttle setting if a specified speed $r_{max}$ is exceeded. This is illustrated schematically in FIG. 23. The rate of throttle reduction, k, is set to be high. If the controlled engine speed $r_d$ drops below the maximum power speed $r_m$ at any throttle position s, the engine will tend to stall. The stall limiter arrangement illustrated in FIG. 24 is therefore used to limit the blade pitch to a maximum value determined by $r_m$ and r, in order to avoid stalling.

The throttle, $s_i$, also has to be held within its operating range, which is checked at the output of the throttle limiter. Limiting can only occur when turning, so the residual throttle $\Delta s_{ij}$ (the difference between the calculated and limited throttle) is fed back to the other engine to maintain turning ability (at the expense of forward speed). (Suffix i refers to the engine system illustrated in FIG. 20 while the suffix j refers to the other of the two engine systems). The throttle arrangement and throttle limiter arrangement are illustrated schematically in FIGS. 25 and 26 respectively.

The control of the motor speed using pitch will be arranged to have a good step response to changes in throttle. The throttle response, derived from engine and propulsor characteristics, will provide craft acceleration whilst allowing the motor to change speed.

The maximum linear acceleration may be limited by including a measurement or estimation of the acceleration in the control system.

Figure 27:
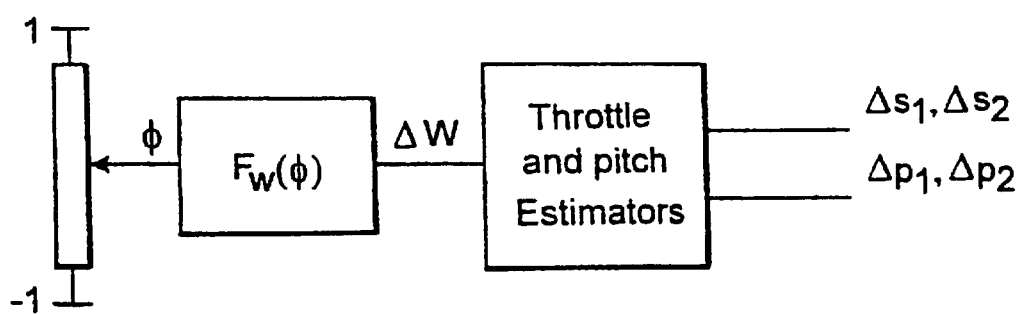
FIG. 27 is a block diagram of a steering control arrangement for the system of FIG. 20.

Steering Control (FIG. 27)

To steer the craft the power applied to the inner propulsor must be decreased relative to the power applied to the outer propulsor. This is accomplished by varying the control speed of the outer engine relative to the inner engine, or by increasing the pitch of the outer propulsor whilst decreasing the pitch of the inner propulsor, or by a combination of both engine speed and pitch variations.

In this case, if suffix 1 and 2 refer to the inner and outer propulsors respectively it is sufficient to add incremental throttle settings $\Delta s1$, $\Delta s2$ to the input throttle settings s, and add $\Delta p1$, $\Delta p2$ to the input pitch setting p so that the changed motor power is absorbed by the power consumed by each propulsor, and the motor speed remains constant.

$$s_1 = |s - \Delta s_1|, \quad s_2 = |s + \Delta s_2|$$

$$p_1 = |p - \Delta p_1|, \quad p_2 = |p + \Delta p_2|$$

where $$\Delta s = F_s(\phi, r), \quad \Delta p = F_p(s, \Delta s)$$

and where $F_s$, $F_p$ are functions of the motor and propulsor characteristics.

In most cases at lower speeds $\Delta s_1 \approx \Delta s_2$, whilst at higher speeds $\Delta s_1 > \Delta s_2$ due to non-linearities in the engine power curve. At low speeds, the term $(s - \Delta s_1)$ could become negative which is an unreal state. In this condition, the sign of dir will change resulting in a pitch angle change resulting in negative thrust. The value of $s_1 = |s - \Delta s_1|$ remains positive.

The yaw rate may be limited by the inclusion of a measurement or estimate of the acceleration in the control loop.

Mode Control

As well as the basic modes described above, the following modes are used:

1. Emergency control

The control system includes maximum linear and yaw acceleration for passenger comfort. These limits need to be over-ridden in the case of emergency manoeuvres.

2. Craft speed control

The required craft speed is selected. The error between the measured craft speed and the selected speed is fed back into the engine controller to maintain the required craft speed.

3. Dynamic Positioning (DP) control

The craft speed and heading are controlled.

In the case of total failure of an engine or propulsor controller, mechanical controls may be provided to directly control the engine throttle positions or the propulsor pitches. In the case of the failure of an engine or propulsor, the use of an emergency rudder is required to maintain course. In this case the single remaining engine and propulsor provides only speed and fore/aft control.

Control System

As noted above, FIG. 20 shows only the control system for a single engine and a single propulsor. The residual throttle signal $\Delta s_{12}$ from the throttle limiter is fed back into the $\Delta s_2$ signal additioner of the opposite engine controller, and the $\Delta s_{21}$ signal is the signal returned from the opposite Throttle Limiter into the $\Delta s_1$ signal additioner shown.

It will be appreciated that various modifications to the above-described embodiments are possible without departing from the scope of the invention. For example, in some cases the ratio S/C of the blade spacing to blade chord may be less than 2.0 along a small portion of the length of each blade. In some cases up to 10% of the length of the blades may have an S/C ratio of less than 2.0. For example, in one possible embodiment the ratio (S/C) is less than 2.0, preferably in the range of 1.7–2.0, at a root portion of the blades. This will be particularly be the case for propellers designed for use with relatively heavy, semi-planing craft. For such craft it will be appreciated that, in order to obtain a desired cruising speed for the craft, other limiting factors such as, for example, the hull transom size and the desired flow area through the propeller, may mean that the chosen S/C ratio will generally need to be less than the S/C ratio which would be used for a propeller for a high speed planing craft.

For high speed planing craft, the S/C ratio will generally always be at least 2.0 along 95% or more of the length of the blades.

What is claimed is:

1. A propulsion system for a water craft, the system comprising:

at least one shaft which extends rearwardly from the transom of the hull of the water craft;

a surface-piercing propeller mounted on said at least one shaft, proximal to a trailing edge of the hull, so that said propeller operated, in use, in a transom cavity created behind the transom of the hull; and drive means for driving said at least one shaft;

wherein said propeller comprises a hub and a plurality of blades angularly spaced apart, substantially equidistantly, therearound, the ratio of the spacing of the blades to the blade chord being at least 2.0 along substantially the whole length of the blades, and wherein the end profile of the hull of the craft comprises at least one convex, generally arcuate profile projection which corresponds generally to the profile of the hub of the propeller.

2. A propulsion system according to claim 1, wherein the ratio (S/C) of the blade spacing (S) of adjacent blades to the blade chord (C) is in the range of from two to five along substantially the whole length of the blades.

3. A propulsion system according to claim 2, wherein the ratio (S/C) of the blade spacing (S) to the cord (C) is at least 2.0 along at least 90% of the length of the blades.

4. A propulsion system according to claim 1, wherein the ratio (S/C) of the blade spacing (S) of adjacent blades to the blade chord (C) is in the range of from 2.3 to 4.0 along substantially the whole length of the blades.

5. A propulsion system according to claim 1, wherein the ratio (S/C) of the blade spacing (S) to the blade chord (C) is at least 2.0 along at least 90% of the length of the blades.

6. A propulsion system according to claim 5, wherein the ratio (S/C) of the blade spacing (S) to the blade chord (C) is at least 2.0 along at least 95% of the length of the blades.

7. A propulsion system according to claim 1, wherein the ratio ($H_d/P_d$) of hub diameter ($H_d$) to propeller diameter ($P_d$) is at least 0.35.

8. A propulsion system according to claim 1, wherein the ratio ($H_d/P_d$) of hub diameter ($H_d$) to propeller diameter ($P_d$) is at least 0.4.

9. A propulsion system according to claim 1, wherein the propeller (4) is mounted on said at least one shaft (1) in such a way that the plane of the propeller is substantially perpendicular to said shaft.

10. A propulsion system according to claim 1, wherein the shaft is mounted to the craft in such a manner that the plane of the propeller (4) is substantially normal to the line of thrust.

11. A propulsion system according to claim 1, wherein the ratio ($P_d/H_s$) of propeller diameter ($P_d$) to static hull draught ($H_s$) is at least 1.4.

12. A propulsion system according to claim 1, wherein the pitch ($\beta$) of the blades (6) of the propeller, relative to the rotational axis of the propeller, is variable.

13. A propulsion system according to claim 12, further including blade pitch control means in the propulsion system for controlling the pitch of the blades.

14. A propulsion system according to claim 13, wherein the blade pitch control means is formed and arranged to enable the pitch ($\beta$) of the blades to be varied between 50° and 120°.

15. A propulsion system according to claim 14, wherein the blade pitch control means is implemented in one or more of: mechanical means, electrical means and hydraulic means.

16. A propulsion system according to claim 14, wherein said blade control means comprises mechanical pitch control means in the form of a pitch control rod (14) linked to carrier means (18) on which the blades (6) are mounted, said control rod and carrier means being formed and arranged such that axial motion of the control rod is translated into rotational motion of the carrier means, whereby the blades are rotated so as to change their pitch relative to the rotational axis of the propeller.

17. A propulsion system according to claim 14, wherein the blade pitch control means further includes an intelligent pitch controller system for automatically controlling the pitch of the blades depending on one or more of: the desired speed of the craft; actual speed of the craft; desired engine speed; actual engine speed; position of the craft in the water; desired course of the craft; and actual course of the craft.

18. A propulsion system according to claim 13, wherein the blade pitch control means is implemented in one or more of: mechanical means, electrical means and hydraulic means.

19. A propulsion system according to claim 18, wherein the blade pitch control means further includes an intelligent pitch controller system for automatically controlling the pitch of the blades depending on one or more of: the desired speed of the craft; actual speed of the craft; desired engine speed; actual engine speed; position of the craft in the water; desired course of the craft; and actual course of the craft.

20. A propulsion system according to claim 13, wherein said blade control means comprises mechanical pitch control means in the form of a pitch control rod (14) linked to carrier means(18) on which the blades (6) are mounted, said control rod and carrier means being formed and arranged such that axial motion of the control rod is translated into rotational motion of the carrier means, whereby the blades are rotated so as to change their pitch relative to the rotational axis of the propeller.

21. A propulsion system according to claim 20, wherein the blade pitch control means further includes an intelligent pitch controller system for automatically controlling the pitch of the blades depending on one or more of: the desired speed of the craft; actual speed of the craft; desired engine speed; actual engine speed; position of the craft in the water; desired course of the craft; and actual course of the craft.

22. A propulsion system according to claim 13, wherein the blade pitch control means further includes an intelligent pitch controller system for automatically controlling the pitch of the blades depending on one or more of: the desired speed of the craft; actual speed fo the craft; desired engine speed; actual engine speed; position of the craft in the water; desired course of the craft; and actual course of the craft.

23. A propulsion system according to claim 22, wherein the intelligent pitch controller system also controls engine speed of the craft.

24. A propulsion system according to claim 22, wherein said intelligent pitch controller system is adapted to vary the pitch of the blades so as to maintain the rotational velocity of the or each said propeller at a constant velocity.

25. A propulsion system according to claim 1, wherein the system includes at least two shafts (1) extending rearwardly from the transom (2) of the hull (3) of the craft, each shaft having a propeller (4) mounted thereon, each said propeller comprising a hub (5) and a plurality of blades (6) angularly spaced apart, substantially equidistantly, therearound, the ratio (S/C) of the spacing (S) of the blades to the blade chord (C) being at least 2.0 along substantially the whole length of the blades.

26. A propulsion system according to claim 25, wherein blade pitch control means is provided for controlling the pitch of the blades on each said propeller.

27. A propulsion system according to claim 26, wherein said blade pitch control means is formed and arranged for varying the pitch of the propeller blades of each propeller independently.

28. A propulsion system according to claim 27, wherein the blade pitch control means further includes an intelligent pitch controller system for automatically controlling the pitch of the blades depending on one or more of: the desired speed of the craft; actual speed of the craft; desired engine speed; actual engine speed; position of the craft in the water; desired course of the craft; and actual course of the craft.

29. A propulsion system according to claim 28, wherein the intelligent pitch controller system controls axial movement of pitch control rods of the pitch control means so as to vary the pitch of the propeller blades of the two propellers.

30. A propulsion system according to claim 26, wherein the blade pitch control means further includes an intelligent pitch controller system for automatically controlling the pitch of the blades depending on one or more of: the desired speed of the craft; actual speed of the craft; desired engine speed; actual engine speed; position of the craft in the water; desired course of the craft; and actual course of the craft.

31. A propulsion system according to claim 30, wherein the intelligent pitch controller system controls axial movement of pitch control rods of the pitch controls means so as to vary the pitch of the propeller blades of the two propellers.

32. A propulsion system according to claim 31, wherein the intelligent pitch controller system also controls engine speed of the craft.

33. A propulsion system according to claim 1, wherein the number of blades per propeller is between two and five.

34. A propulsion system according to claim 1, wherein the blades are twisted along their lengths.

35. A propulsion system according to claim 34, wherein the twist is no greater than 20°.

36. A propulsion system according to claim 1, wherein the arc of said at least on convex projection is up to approximately 180°.

37. A propulsion system according to claim 1, further including guard means (38, 39, 40) provided for enclosing the propeller so as to prevent any obstruction entering between the blades (6).

38. A propulsion system for a water craft, the system comprising:

at least one shaft which extends rearwardly from the transom of the hull of the water craft;

a surface-piercing propeller mounted on said at least one shaft, proximal to a trailing edge of the hull, so that said propeller operates, in use, in a transom cavity created behind the transom of the hull; and drive means for driving said at least one shaft, wherein said propeller comprises a hub and a plurality of blades angularly spaced apart, substantially equidistantly, therearound, wherein the end profile of the bottom portion of the hull of the craft comprises at least one convex, generally arcuate profile projection which corresponds generally to the profile of the hub of the propeller and increases the area of water swept out by the propeller underwater thereby increasing the efficiency of the propeller.

* * * * *